United States Patent
Maeda et al.

(10) Patent No.: US 9,811,476 B2
(45) Date of Patent: Nov. 7, 2017

(54) ENCRYPTION AND RECORDING APPARATUS, ENCRYPTION AND RECORDING SYSTEM, AND ENCRYPTION AND RECORDING METHOD

(71) Applicant: Panasonic Intellectual Property Management Co., Ltd., Osaka (JP)

(72) Inventors: Takuji Maeda, Osaka (JP); Shinji Inoue, Osaka (JP); Yoshikazu Katoh, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/769,615

(22) PCT Filed: Feb. 6, 2014

(86) PCT No.: PCT/JP2014/000640
§ 371 (c)(1),
(2) Date: Aug. 21, 2015

(87) PCT Pub. No.: WO2014/132572
PCT Pub. Date: Sep. 4, 2014

(65) Prior Publication Data
US 2016/0004646 A1 Jan. 7, 2016

(30) Foreign Application Priority Data
Feb. 28, 2013 (JP) .................................. 2013-038394

(51) Int. Cl.
*H04L 9/32* (2006.01)
*G06F 12/14* (2006.01)
(Continued)

(52) U.S. Cl.
CPC ...... *G06F 12/1408* (2013.01); *G06F 12/0238* (2013.01); *G06F 21/62* (2013.01);
(Continued)

(58) Field of Classification Search
CPC .. G06F 12/1408; G06F 12/0238; G06F 21/62; G06F 2212/1052; G06F 2212/202; H04L 9/088; H04L 9/0897
See application file for complete search history.

(56) References Cited

U.S. PATENT DOCUMENTS 6,606,707 B1 8/2003 Hirota et al.
6,789,192 B2 9/2004 Hirota et al.
(Continued)

FOREIGN PATENT DOCUMENTS

EP 1737156 * 12/2006 ............... H04L 9/32
EP 1 998 270 12/2008
(Continued)

OTHER PUBLICATIONS

International Search Report issued May 13, 2014 in corresponding International Application No. PCT/JP2014/000640.
(Continued)

*Primary Examiner* — Sharon Lynch
(74) *Attorney, Agent, or Firm* — Wenderoth, Lind & Ponack, L.L.P.

(57) ABSTRACT

An encryption and recording apparatus storing data, the apparatus including: a first nonvolatile memory; a second nonvolatile memory; and an encryption and decryption control unit, wherein the encryption and decryption control unit: manages an area included in the second nonvolatile memory on a per-block basis, and manages association between a block and a block-unique key using key management information stored in the first nonvolatile memory; receives the data and corresponding information associated with the data; encrypts the data, using one or more block-unique keys associated with one or more blocks included in the second nonvolatile memory and writes the data to the one or more blocks; and stores the corresponding information into the key management information, associating the (Continued)

corresponding information and the one or more block-unique keys.

6 Claims, 19 Drawing Sheets

(51) Int. Cl.
*G06F 21/62* (2013.01)
*H04L 9/14* (2006.01)
*H04L 9/08* (2006.01)
*G06F 12/02* (2006.01)

(52) U.S. Cl.
CPC ............ *H04L 9/088* (2013.01); *H04L 9/0897* (2013.01); *H04L 9/14* (2013.01); *G06F 2212/1052* (2013.01); *G06F 2212/202* (2013.01); *H04L 2209/605* (2013.01)

(56) References Cited

U.S. PATENT DOCUMENTS

| | | | |
|---|---|---|---|
| 7,062,652 B2 | 6/2006 | Hirota et al. | |
| 7,996,914 B2 | 8/2011 | Hirota et al. | |
| 8,127,368 B2 | 2/2012 | Hirota et al. | |
| 8,140,843 B2 | 3/2012 | Holtzman et al. | |
| 8,245,031 B2 | 8/2012 | Holtzman et al. | |
| 8,266,711 B2 | 9/2012 | Holtzman et al. | |
| 8,325,508 B2* | 12/2012 | Kawai | G11C 11/5685 365/148 |
| 8,369,151 B2 | 2/2013 | Yoneya et al. | |
| 8,395,925 B2* | 3/2013 | Kawai | G11C 13/0007 365/148 |
| 8,477,525 B2 | 7/2013 | Ito | |
| 8,613,103 B2 | 12/2013 | Holtzman et al. | |
| 8,635,463 B2* | 1/2014 | Nakanishi | G06F 21/602 713/189 |
| 8,639,939 B2 | 1/2014 | Holtzman et al. | |
| 8,661,553 B2 | 2/2014 | Hirota et al. | |
| 9,128,876 B2* | 9/2015 | Cordella | G06F 12/1408 |
| 9,165,663 B2* | 10/2015 | Tao | G06F 12/1408 |
| 2003/0037248 A1* | 2/2003 | Launchbury | G06F 12/1408 713/193 |
| 2003/0221103 A1 | 11/2003 | Hirota et al. | |
| 2005/0005149 A1 | 1/2005 | Hirota et al. | |
| 2005/0125698 A1* | 6/2005 | Yeates | G06F 21/6245 726/19 |
| 2006/0129819 A1 | 6/2006 | Hirota et al. | |
| 2006/0236406 A1* | 10/2006 | Johnson | G06F 11/1464 726/27 |
| 2007/0136607 A1* | 6/2007 | Launchbury | G06F 12/1408 713/190 |
| 2008/0010449 A1 | 1/2008 | Holtzman et al. | |
| 2008/0010450 A1 | 1/2008 | Holtzman et al. | |
| 2008/0010451 A1 | 1/2008 | Holtzman et al. | |
| 2008/0010452 A1 | 1/2008 | Holtzman et al. | |
| 2008/0010455 A1 | 1/2008 | Holtzman et al. | |
| 2008/0010458 A1 | 1/2008 | Holtzman et al. | |
| 2008/0010685 A1 | 1/2008 | Holtzman et al. | |
| 2008/0022395 A1 | 1/2008 | Holtzman et al. | |
| 2008/0022413 A1 | 1/2008 | Holtzman et al. | |
| 2008/0034440 A1 | 2/2008 | Holtzman et al. | |
| 2008/0115210 A1 | 5/2008 | Hirota et al. | |
| 2008/0162804 A1* | 7/2008 | Iida | G06F 21/31 711/112 |
| 2009/0135638 A1* | 5/2009 | Shimizu | G11C 5/02 365/51 |
| 2010/0049906 A1* | 2/2010 | Tao | G06F 12/1408 711/103 |
| 2010/0138652 A1 | 6/2010 | Sela et al. | |
| 2010/0322008 A1 | 12/2010 | Yoneya et al. | |
| 2011/0110144 A1* | 5/2011 | Kawai | G11C 11/5685 365/148 |
| 2011/0228587 A1 | 9/2011 | Ito | |
| 2012/0030268 A1 | 2/2012 | Liu et al. | |
| 2012/0084574 A1* | 4/2012 | Nakanishi | G06F 21/79 713/193 |
| 2012/0117663 A1 | 5/2012 | Hirota et al. | |
| 2013/0145177 A1* | 6/2013 | Cordella | G06F 12/1408 713/193 |
| 2013/0198361 A1* | 8/2013 | Matsuzaki | H04L 41/50 709/223 |
| 2013/0227304 A1* | 8/2013 | Suenaga | G06F 21/80 713/193 |
| 2014/0006797 A1* | 1/2014 | Cordella | G06F 21/64 713/189 |
| 2016/0373264 A1* | 12/2016 | Katoh | H04L 9/3278 |

FOREIGN PATENT DOCUMENTS

| | | |
|---|---|---|
| EP | 2 045 814 | 4/2009 |
| JP | 2001-14441 | 1/2001 |
| JP | 2001-345796 | 12/2001 |
| JP | 3389186 | 3/2003 |
| JP | 2005-174388 | 6/2005 |
| JP | 2008-66438 | 3/2008 |
| JP | 2008-66882 | 3/2008 |
| JP | 2008-109276 | 5/2008 |
| JP | 2009-20871 | 1/2009 |
| JP | 2009-93786 | 4/2009 |
| JP | 2009-543212 | 12/2009 |
| JP | 2010-140298 | 6/2010 |
| JP | 2010-288123 | 12/2010 |
| JP | 2011-3235 | 1/2011 |
| JP | 2011-198407 | 10/2011 |
| WO | 2008/008245 | 1/2008 |

OTHER PUBLICATIONS

I. G. Baek et al., "Highly Scalable Non-volatile Resistive Memory using Simple Binary Oxide Driven by Asymmetric Unipolar Voltage Pulses", 2004 IEEE International Electron Devices Meeting, IEDM Technical Digest, Dec. 13-15, 2004, p. 587.

* cited by examiner

FIG. 5

Password management table 141

| No. | File name | Password |
|---|---|---|
| 1 | /AUDIO/TITLE1 . MP3 | "PASSWORD1" |
| 2 | /GAME/BASEBALL . EXE | "PASSWORD2" |
| 3 | /VIDEO/JOURNEY1 . MP4 | "PASSWORD3" |
| 4 | /AUDIO/TITLE2 . MP3 | "PASSWORD4" |
| : | : | : |

FIG. 6A

Key management table 241

| Address | Block-unique key | Password |
|---|---|---|
| 0x0000 | 0x3FD2150B | – |
| 0x0001 | 0xBDF34D3A | – |
| ⋮ | ⋮ | ⋮ |
| 0x1000 | 0x103433DA | "PASSWORD4" |
| 0x1001 | 0xF29F4E22 | "PASSWORD1" |
| 0x1002 | 0xC234D1AA | "PASSWORD2" |
| 0x1003 | 0x76200C16 | "PASSWORD1" |
| 0x1004 | 0x002FD7DC | "PASSWORD4" |
| 0x1005 | 0xAA342CE4 | "PASSWORD4" |
| 0x1006 | 0x871C2A24 | "PASSWORD3" |
| 0x1007 | 0x002FD7DC | "PASSWORD4" |
| 0x1008 | 0x43DE21C9 | "PASSWORD3" |
| ⋮ | ⋮ | ⋮ |

FIG. 10

Key management table 241

| Address | Block-unique key | Password |
|---|---|---|
| 0x0000 | 0x3FD2150B | – |
| 0x0001 | 0xBDF34D3A | – |
| ⋮ | ⋮ | ⋮ |
| 0x1000 | 0x103433DA | Deleted |
| 0x1001 | 0xF29F4E22 | "PASSWORD1" |
| 0x1002 | 0xC234D1AA | "PASSWORD2" |
| 0x1003 | 0x76200C16 | "PASSWORD1" |
| 0x1004 | 0x002FD7DC | Deleted |
| 0x1005 | 0xAA342CE4 | Deleted |
| 0x1006 | 0x871C2A24 | "PASSWORD3" |
| 0x1007 | 0x002FD7DC | Deleted |
| 0x1008 | 0x43DE21C9 | "PASSWORD3" |
| ⋮ | ⋮ | ⋮ |

ENCRYPTION AND RECORDING APPARATUS, ENCRYPTION AND RECORDING SYSTEM, AND ENCRYPTION AND RECORDING METHOD

TECHNICAL FIELD

The present disclosure relates to an encryption and recording apparatus which stores a content file storing digital data, such as music, videos, books, or games, and an encryption and recording system which includes the encryption and recording apparatus and an access apparatus which accesses the encryption and recording apparatus.

BACKGROUND ART

Many types of information recording media such as a hard disk, an optical disc, etc., exist for storing files (hereinafter, content files) storing various types of digital data such as music content, video content, book content, or game content. A memory card using a semiconductor memory which is one type of such information recording media, as a recording element, is small in size and light in weight, and thus is widely used, mainly in small-sized information appliances such as smartphones, tablets, etc.

For example, Patent Literature (PTL) 1 discloses a memory card having two recording regions of different types therein and provides copyright protection features.

CITATION LIST

Patent Literature

[PTL 1] Japanese Patent No. 3389186

SUMMARY OF INVENTION

Technical Problem

The present disclosure provides an encryption and recording apparatus, an encryption and recording system, and an encryption and recording method which have high security strengths.

Solution to Problem

An encryption and recording apparatus according to the present disclosure is an encryption and recording apparatus storing data, including: a first nonvolatile memory; a second nonvolatile memory; and an encryption and decryption control unit configured to encrypt and write the data to the second nonvolatile memory, and read the encrypted data from the second nonvolatile memory and decrypt the encrypted data, wherein the encryption and decryption control unit is configured to: manage an area included in the second nonvolatile memory on a per-block basis and manage association between a block and a block-unique key using key management information stored in the first nonvolatile memory; when receiving a write indication for writing the data from an access apparatus external to the encryption and recording apparatus, receive the data and corresponding information associated with the data, encrypt the data using one or more block-unique keys associated with one or more blocks included in the second nonvolatile memory and write the data to the one or more blocks; and store the corresponding information into the key management information, associating the corresponding information from the access data apparatus and the one or more block-unique keys.

An encryption and recording system according to the present disclosure is an encryption and recording system including: an encryption and recording apparatus storing data; and an access apparatus which accesses the encryption and recording apparatus, the encryption and recording apparatus including: a first nonvolatile memory; a second nonvolatile memory; and an encryption and decryption control unit configured to encrypt and write the data to the second nonvolatile memory, and read the encrypted data from the second nonvolatile memory and decrypt the encrypted data, wherein the encryption and decryption control unit is configured to: manage an area included in the second nonvolatile memory on a per-block basis, and manage association between a block and a block-unique key using key management information stored in the first nonvolatile memory, when receiving a write indication for writing the data from an access apparatus external to the encryption and recording apparatus, receive the data and corresponding information associated with the data, encrypt the data using one or more block-unique keys associated with one or more blocks included in the second nonvolatile memory, and write the data to the one or more blocks, and store the corresponding information into the key management information, associating the corresponding information and the one or more block-unique keys, the access apparatus including: an in-access apparatus nonvolatile memory; and an access control unit, wherein the access control unit is configured to manage the corresponding information associated with data stored in the encryption and recording apparatus, in a corresponding information management table stored in the in-access apparatus nonvolatile memory, and when writing the data to the encryption and recording apparatus, designate the data and the corresponding information to the encryption and recording apparatus and write the data.

Advantageous Effects of Invention

According to the encryption and recording apparatus of the present disclosure, an apparatus which encrypts and records data such as a content file and has a high security strength for the data is provided.

BRIEF DESCRIPTION OF DRAWINGS

FIG. 5 is a diagram showing an example of a password management table according to the embodiment 1.

FIG. 6A is a diagram showing an example of a key management table according to the embodiment 1.

FIG. 10 is a diagram showing another example of the key management table according to the embodiment 1.

DESCRIPTION OF EMBODIMENTS

Figure 1:
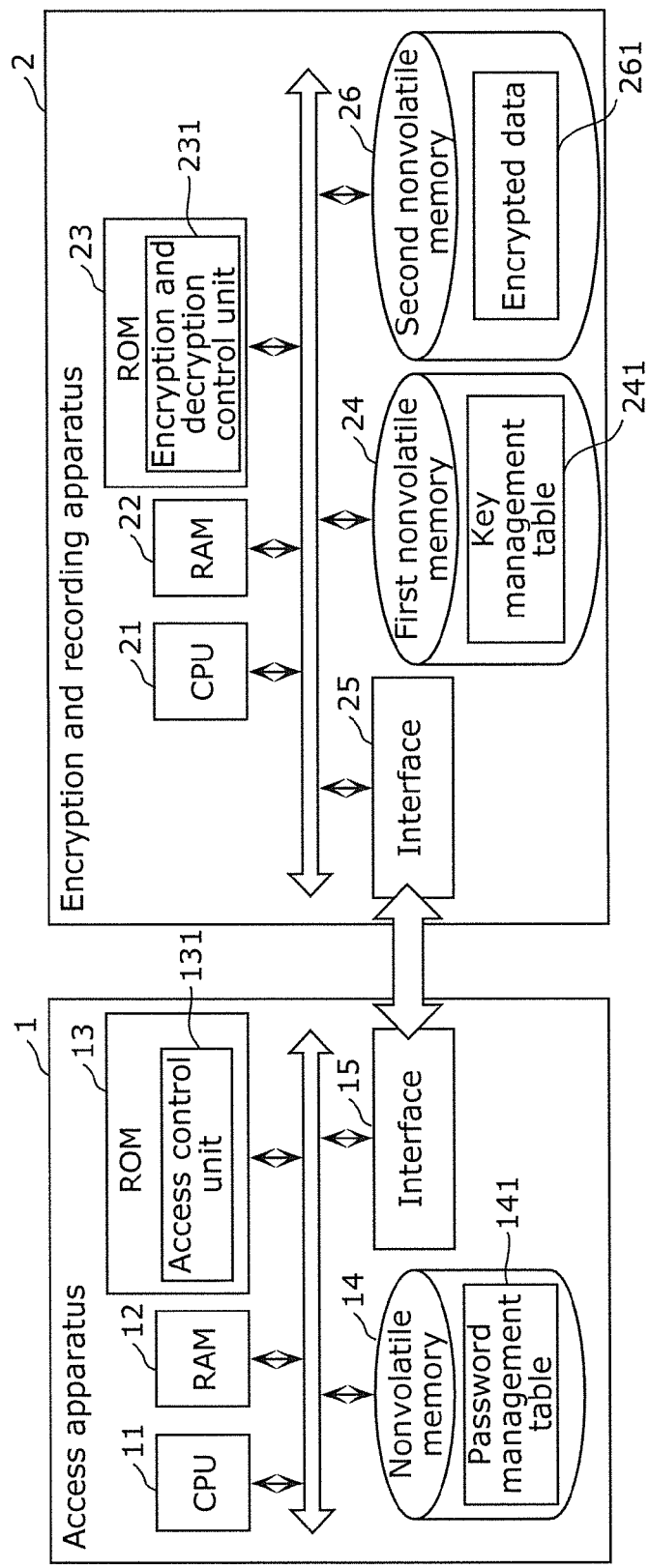
FIG. 1 is a diagram showing configuration of an encryption and recording apparatus and an access apparatus according to an embodiment 1.

The inventors have found that recording apparatuses, such as conventional memory cards, have the following drawback.

Many types of memory cards having different shapes and specifications exist, including ones that provide copyright protection features. A memory card having copyright protection features prevents unauthorized copying of a copyrighted content file, and allows secure recording and playback of the copyrighted content file. For this reason, a memory card having copyright protection features has a wide range of applications as compared to conventional recording media, for example, not only used as a recording medium for merely passing data, but also to handle copyrighted content files in digital audio players and smartphones. This is a factor for promoting the widespread use of the memory card.

An example mechanism for the copyright protection by a memory card having copyright protection features is achieved by the memory card having two recording regions (e.g., see PTL 1).

Such a memory card has a concealed region and a normal region. The concealed region is a recording region which an access apparatus, such as a digital audio player, is allowed to access only if validity between the access apparatus and the memory card is authenticated. The normal region is a recording region to which the access apparatus is allowed free access, irrespective of authenticating.

The memory card records a content file encrypted (hereinafter, an encrypted content file) into the normal region and stores key data (hereinafter, a decryption key) for decrypting the content file into the concealed region.

Storing the encrypted content file and the decryption key separately in the two recording regions (Hereinafter, also simply referred to as "regions.") in the memory card as such prevents an unauthorized access apparatus, the validity of which with the memory card is not authenticated, from accessing the decryption key stored in the concealed region. This disallows the access apparatus to decrypt the encrypted content file, consequently, prohibits the access apparatus from using the content file.

Likewise, as another example of copyright protection, it is contemplated that only an encrypted content file is stored in the memory card and the decryption key is held in the access apparatus.

In this case, for playback or use of a content file, the access apparatus reads the encrypted content file from the memory card and decrypts it using a decryption key the access apparatus is holding therein.

Thus, even if the memory card storing the encrypted content file is lost and a user unauthorized to use the encrypted content file picks it up, the decryption key is not in an access apparatus held by the unauthorized user. Consequently, the content file cannot be played or used by the unauthorized access apparatus and the content copyright is thus protected.

As mentioned above, an encrypted content file is, in general, managed in association one-to-one with a decryption key for decrypting the encrypted content file.

The above technology, however, has the following drawbacks.

Since an encrypted content file is managed in association one-to-one with a corresponding decryption key, a content file is added or deleted by adding or deleting a pair of an encrypted content file and a decryption key which are associated with the content file. Thus, the encrypted content file is easily managed.

On the other hand, in the above management approach, data stored in the encrypted content file is common for all users and individual memory cards. Thus, the data is liable to unauthorized cryptanalysis such as cracking.

The present disclosure is made based on such findings. Through intensive studies, the inventors have established conception of an encryption and recording apparatus, etc. which have high security strengths.

Hereinafter, embodiments according to the present disclosure will be described, with reference to the accompanying drawings. In the following, unnecessarily detailed description may be omitted. For example, detailed description of well-known matters or description previously set forth with respect to components that are substantially the same may be omitted. This is to avoid unnecessary redundancy in the description below and for facilitating an understanding by a person skilled in the art.

The inventors provide the accompanying drawings and the description below for a thorough understanding of the present disclosure by a person skilled in the art, and the accompanying drawings and the description are not intended to be limiting the subject matter recited in the claims appended herewith.

Figures are schematic views and do not necessarily illustrate the present disclosure precisely. In the figures, the same reference signs are used to refer to substantially the same configuration, and thus duplicate description may be omitted or simplified.

[Embodiment 1]

FIG. 1 is a diagram showing configuration of an encryption and recording apparatus and an access apparatus according to an embodiment 1.

In FIG. 1, configuration overviews of an encryption and recording apparatus 2 and an access apparatus 1 included in an encryption and recording system according to the present embodiment are illustrated. FIG. 1 assumes that the access apparatus 1 stores content files into the encryption and recording apparatus 2, and manages them.

The access apparatus 1 according to the present embodiment includes a central processing unit (CPU) 11, a random access memory (RAM) 12, a read only memory (ROM) 13, a nonvolatile memory 14, and an interface 15.

The ROM 13 stores a program for controlling the access apparatus 1. The program runs on a CPU 11, using the RAM 12 as a temporary storage area.

The interface 15 is connection with the encryption and recording apparatus 2, and corresponds to, if the encryption and recording apparatus 2 is a memory card, for example, a memory card slot and a controller LSI or the like which issues a command to access the memory card.

It should be noted that the encryption and recording apparatus 2 may be an on-board device, such as an internal had disk providing SATA (Serial ATA (Advanced Technology Attachment)) connection. In that case, the interface 15 corresponds to a controller LSI or the like which controls SATA. In other words, the encryption and recording apparatus 2 may be either a device built in the access apparatus 1 or an external device.

The nonvolatile memory 14 is in the access apparatus 1 and is an information recording medium capable of non-volatile storage of information, such as Flash memory, a hard disk, an SSD, etc. The nonvolatile memory 14 is storing various pieces of information which are managed by the access apparatus 1.

In the present embodiment, the nonvolatile memory 14 stores a password management table 141 in which a combination of an encrypted content file and a key for decrypting the encrypted content file (hereinafter, a content decryption key) are managed.

It should be noted that the content decryption key is by way of example of corresponding information associated with data (the encrypted content file in the present embodiment). Also, the password management table 141 is by way of example of a corresponding information management table.

The ROM 13 includes an access control unit 131 which manages encrypted content files. Specifically, the program stored in the ROM 13 is executed by the CPU 11, thereby implementing the processing by the access control unit 131 according to the present embodiment.

In the access apparatus 1 according to the present embodiment, the access control unit 131 uses the password management table 141 to control the encrypted content files stored in the encryption and recording apparatus 2. The structure of the password management table 141 and the way of controlling the encrypted content files are described below in detail.

The encryption and recording apparatus 2 shown in FIG. 1 is a recording apparatus which encrypts and stores data (the encrypted content files in the present embodiment). The encryption and recording apparatus 2 includes a CPU 21, a RAM 22, a ROM 23, an interface 25, a first nonvolatile memory 24, and a second nonvolatile memory 26.

Basic functionality of the CPU 21, the RAM 22, and the ROM 23 are substantially the same as described with reference to the access apparatus 1, and thus detailed description thereof is omitted.

The interface 25 is connection with the access apparatus 1, and corresponds to, if the encryption and recording apparatus 2 is a memory card, for example, any one of various types of metal terminals for inputting/outputting a signal to/from the memory card and supplying power to the memory card.

The second nonvolatile memory 26 is managed by a file system, such as File Allocation Table (FAT). The second nonvolatile memory 26 is a region into which the access apparatus 1 stores, as encrypted data 261, an encrypted content file together with various types of data.

The first nonvolatile memory 24 cannot be accessed directly by the access apparatus 1. The first nonvolatile memory 24 is storing a key management table 241 which is a characterizing element of the present embodiment.

The ROM 23 includes an encryption and decryption control unit 231. Specifically, a program stored in the ROM 23 is executed by the CPU 21, thereby implementing the processing by the encryption and decryption control unit 231 according to the present embodiment.

The encryption and decryption control unit 231 manages an area included in the second nonvolatile memory 26 on a per-block basis, and manages association between a block and a block-unique key using the key management table 241 stored in the first nonvolatile memory 24.

When receiving a write indication for writing data from the access apparatus 1 external to the encryption and decryption control unit 231, the encryption and decryption control unit 231 receives the data and the corresponding information associated with the data, encrypts the data using one or more block-unique keys associated with one or more blocks included in the second nonvolatile memory 26, and writes the data to the one or more blocks.

The encryption and decryption control unit 231 further stores the corresponding information in the key management table 241, associating the corresponding information with the one or more block-unique keys.

More Specifically, in the present embodiment, using the key management table 241, the encryption and decryption control unit 231 provides control to encrypt and decrypt (encryption and decryption control) the area in the second nonvolatile memory 26 on a per-block basis, and provides the encryption and decryption control over the data on a per-file basis.

This allows data included in a content file to be held as different for different users and for different recording apparatuses, while maintaining the convenience of providing the encryption and decryption control over the content file on a per-file basis. In other words, according to the technology of the present disclosure, an encryption and recording apparatus (system) having a high security strength is provided.

The encryption and recording system according to the embodiment 1, as described above, provides the encryption and decryption control over content on a per-file basis. Prior to describing the embodiment 1 in details, the structure of the file system is to be set forth.

FAT file system is described herein by way of example. However, characterizing features described in the embodiment 1 are not limited to any particular type of file system. The characterizing features are applicable to any other file system as well, such as universal disk format (UDF), NT file system (NT File System), etc.

Figure 2:
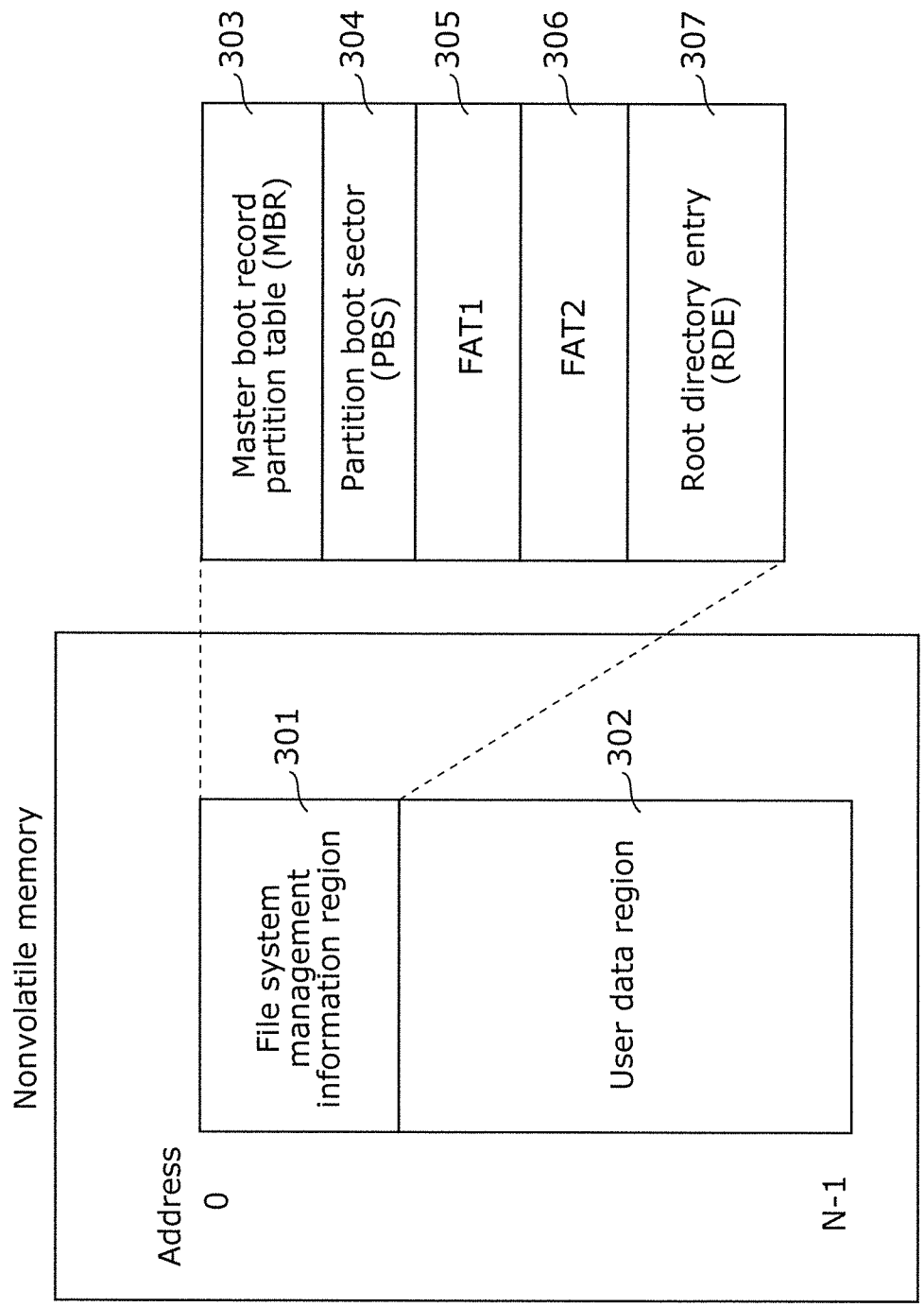
FIG. 2 is a diagram showing a structure of FAT file system.

FIG. 2 shows a structure of FAT file system. There are various types of FAT file systems, including FAT 12, FAT 16, FAT 32, and so on, depending on a bid width, namely, a unit of management in a file allocation table (FAT). Region management schemes implemented by these different types of FAT file systems using a file allocation table are substantially the same. The following description is to be set forth with reference to an example in which the FAT file system is FAT 16.

As shown in FIG. 2, the beginning of the address space is a file system management information region 301 storing file system management information, such as a region allocation unit, and sizes of regions managed by the file system. The file system management information region 301 includes various types of file system management information, including a master boot record partition table 303, a partition boot sector 304, FAT (305, 306), and a root directory entry 307. In other words, the file system management information region 301 is storing information which is necessary to manage a user data region 302.

The master boot record partition table 303 stores information for dividing and managing an address space area managed by the file system into regions known as partitions.

The partition boot sector 304 stores management information for one partition, such as the size of unit of management of the partition.

FAT (305, 306) stores information on storage locations of data included in a file. Typically, there are two FAT (305, 306) storing the same information, providing redundancy so that if one FAT (one of 305 and 306) is damaged, a file can be accessed by the other FAT (the other one of 305 and 306).

The root directory entry 307 stores information (a directory entry) on a file or a directory which is immediately under the root directory.

In FAT file system, following the file system management information region 301, the user data region 302 is provided in which the data of the file is stored, for example.

The user data region 302 is divided and managed on a per unit-of-management basis known as clusters each having a size of about 512 bytes to about 32 kilobytes (KB). Each cluster stores a piece of data included in a file.

A file containing a large amount of data is stored across a plurality of clusters, and links between the clusters are managed by link information stored in FAT (305, 306). Information (directory entries) on files and subdirectories in directories immediately under the root directory are stored in, for example, a portion of the user data region 302.

Figure 3:
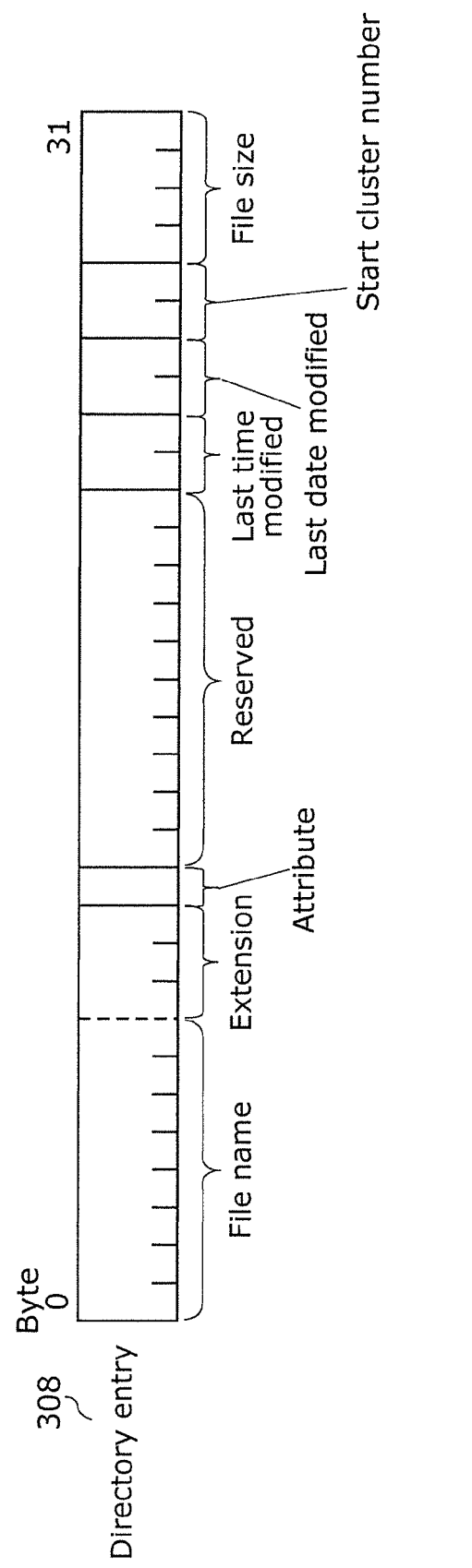
FIG. 3 is a diagram showing a structure of a directory entry.

FIG. 3 is a diagram showing a structure of a directory entry of FAT 16. A directory entry 308 of 32 bytes is allocated to each file or directory. The directory entry 308 stores information on the file or the directory. In other words, each time a file or a directory is added, a new directory entry 308 of 32 bytes is created and recorded into the root directory entry 307 or into the user data region 302.

The first 8 bytes of the directory entry 308 is used to store a name of the file or directory. The following 3 bytes is used to store an extension. Subsequently following 1 byte is used to store attribute information such as a flag identifying a type of the file or directory or a flag identifying whether the file or directory is read-only.

The directory entry 308 also stores information on date and time when the file or directory is last modified, a starting cluster number indicating a location of the start of clusters storing data entity of the file or directory, the size in byte of the file, etc.

As such, the directory entry 308 holds only information on the location of a cluster storing leading data of a file. For this reason, if file data (data included in a file) is stored across a plurality of clusters, its location information is held in FAT (305, 306). In other words, to update the file, it is necessary to write file data and also write information on the data into the directory entry 308 and FAT (305, 306).

Figure 4:
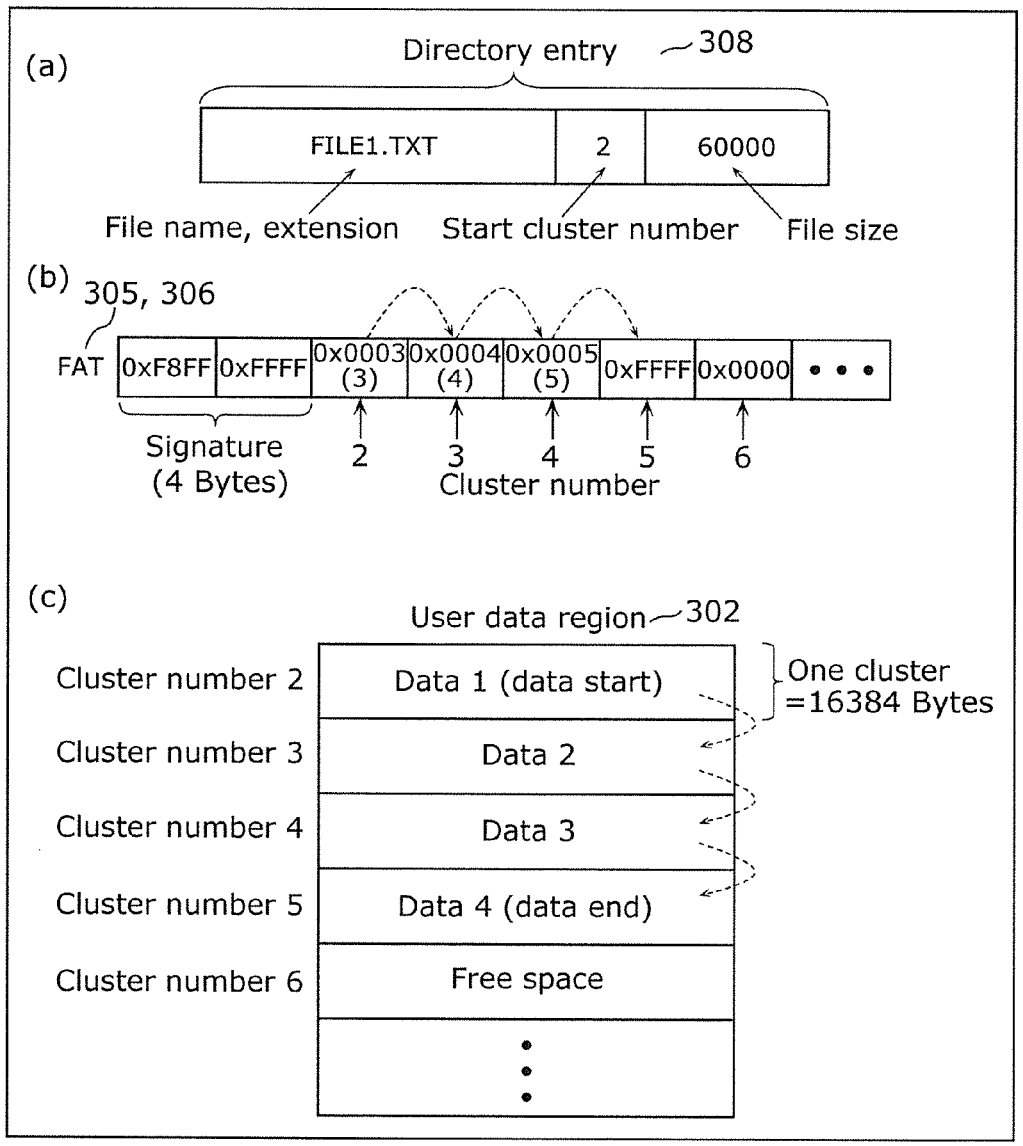
FIG. 4 shows diagrams illustrating example file storage in FAT 16.

FIG. 4 is a diagram illustrating example file storage in FAT 16. Part (a) of FIG. 4 illustrates an example of the directory entry 308, showing that a file named "FILE1.TXT" having a size of 60000 bytes is stored therein. The figure also shows that data body of the file is stored in a region starting at a cluster number "2."

Part (b) of FIG. 4 illustrates an example of FAT (305, 306) in FAT 16. The first 4 bytes of FAT (305, 306) stores a fixed value as signature. A region other than the first 4 byte is associated, by 16 bits, with clusters in the user data region 302.

For example, 16 bits immediately after the signature in the beginning of FAT (305, 306) is associated with a cluster having a cluster number "2," 16 bits immediately thereafter is associated with a cluster having a cluster number "3," and the remaining bits are associated, by 16 bits, with clusters having cluster numbers in ascending order.

A value stored in each 16-bit region indicates a state of an associated region. For example, a 16-bit region storing a value of "0x0000" means that its associated region is an empty cluster, values "0x0002" to "0xFFF6" stored in 16-bit regions each mean a cluster number of the next region to which the 16-bit region is linked. Values "0xFFF8" to "0xFFFF" stored in 16-bit regions each mean that its associated region is the end of the link.

In other words, the example illustrated in (b) of FIG. 4 indicates that the regions having the cluster numbers "2," "3," "4," and "5 " are storing the data body of "FILE1.TXT," as illustrated in (c) FIG. 4.

In FAT file system, the file information, such as a file name and a file size is stored and managed in the directory entry 308 and the storage location of file data is managed by FAT (305, 306) in this manner. In other words, a file data storing process is performed by determining a storage location region from FAT (305, 306), and issuing a data write indication to an information recording apparatus, designating an address and a size of the determined region. The file data storing process is performed in the same or similar manner by any other file system, not limiting to by FAT file system.

In the embodiment 1, the data storage location of an encrypted content file is managed by a file system, as with conventional. Furthermore, a content decryption key for decrypting the encrypted content file is managed in association one-to-one with the encrypted content file in the access apparatus 1.

Next, referring to FIG. 5, the password management table 141 according to the embodiment 1 is described.

The password management table 141 manages correspondence between an encrypted content file and a content decryption key, and is stored in the nonvolatile memory 14 of the access apparatus 1. The password management table 141 stores a list of file names (names of encrypted content files) and its corresponding passwords (a type of content decryption key).

For example, in the example of FIG. 5, an encrypted content file named "/AUDIO/TITLE1.MP3" and a password "PASSWORD1" as a key are managed, being associated with each other. In the present embodiment, an example is to be described in which the encryption and recording apparatus 2 is authenticated with a password defined in ASCII code and decrypts an encrypted content file.

As described above, in the access apparatus 1, one password (a content decryption key) is managed for one encrypted content file. This simplifies management of the encrypted content file, and facilitates addition and deletion of the encrypted content file.

Figure 6B:
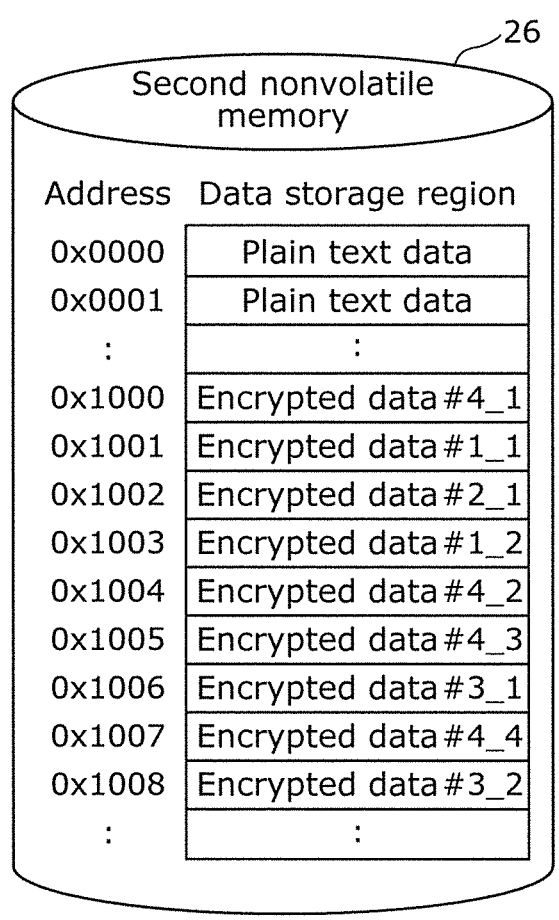
FIG. 6B is a diagram showing an example of information stored in a second nonvolatile memory according to the embodiment 1.

Next, the key management table 241 according to the embodiment 1 is described, with reference to FIGS. 6A and 6B.

The key management table 241 is by way of example of key management information. In the present embodiment, the key management table 241 manages association between a password and an address which are input from the access apparatus 1 and a block-unique key which is a key used to encrypt and decrypt data stored at the address.

The key management table 241 is stored in the first nonvolatile memory 24 of the encryption and recording apparatus 2. In the present embodiment, the access apparatus 1 records the encrypted content file into the encryption and recording apparatus 2, thereby storing data of the encrypted content file into the second nonvolatile memory 26 in the encryption and recording apparatus 2 (see FIG. 6B).

At that time, the area of the second nonvolatile memory 26 is divided and managed on a per-block basis (a per-fixed-length block basis in the present embodiment), and data in the blocks are managed so as to be encrypted and decrypted using unique keys (block-unique keys) different from one another.

In the key management table 241, a set of a block-unique key used to encrypt and decrypt each block and an address corresponding to the block-unique key is recorded. For example, a block-unique key "0x3FD2150B" is used to encrypt and decrypt a block at an address "0x0000" in FIG. 6A. Likewise, a block-unique key "0xBDF34D3A" is used to encrypt and decrypt a block at an address "0x0001." It should be noted that the "encryption and decryption of a block" refer to encryption and decryption of data stored in the block.

Furthermore, in the key management table 241, correspondences between individual blocks and passwords are also managed. The password is information designated by the access apparatus 1 to store data of the encrypted content file, and is the same as the information stored in the password management table 141.

Figure 7:
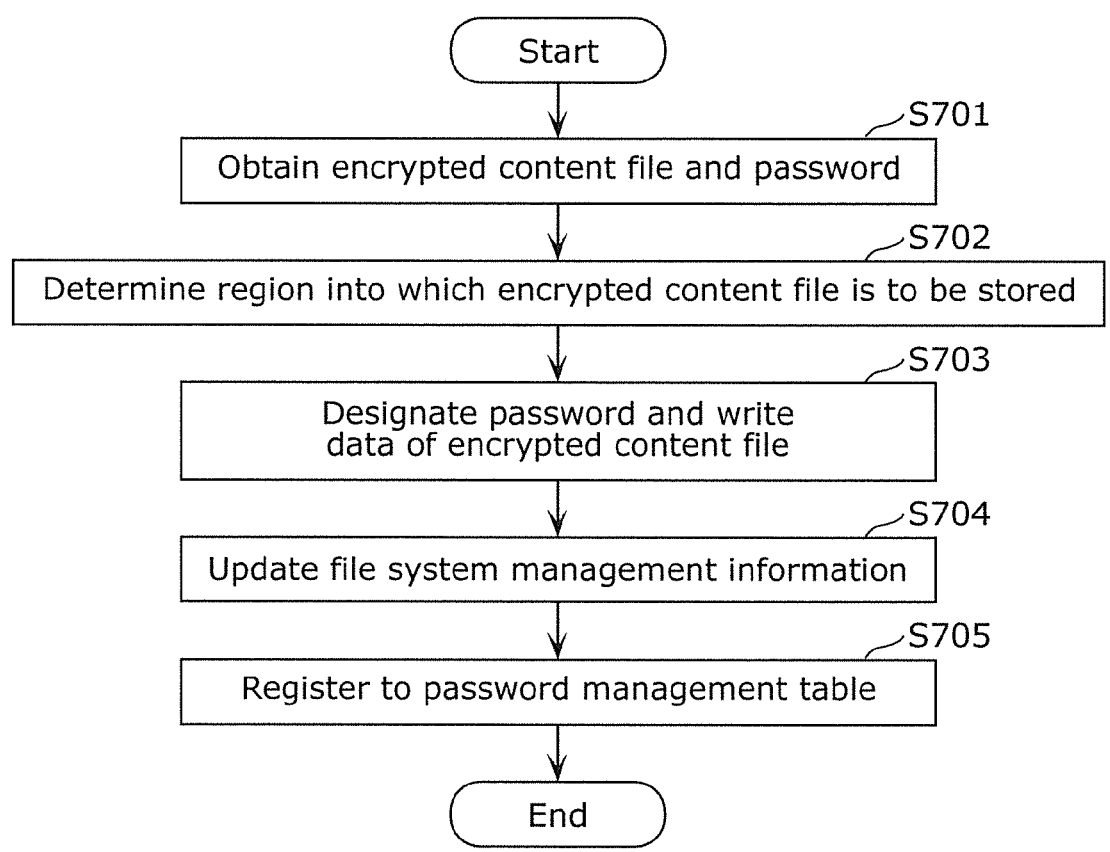
FIG. 7 is a flowchart illustrating a procedure of storing an encrypted content file according to the embodiment 1.

Next, referring to FIG. 7, the procedure of storing the encrypted content file according to the embodiment 1 is described. Herein, processing is described from when the access apparatus 1 obtains an encrypted content file from an external server or the like until when the access apparatus 1 stores the encrypted content file into the encryption and recording apparatus 2.

First, the access apparatus 1 obtains an encrypted content file and a password (a content decryption key) for decrypting the encrypted content file from the external server or the like (S701). This process corresponds to processing in which, for example, smartphone connects to a music content distribution site and performs a process of purchasing content, and downloads the content into the smartphone.

Next, the access apparatus 1 refers to FAT (305, 306) to look for a free space and determines a region into which the encrypted content file is to be stored (S702).

Next, the access apparatus 1 writes data of the encrypted content file to the free space, determined in S702, on the second nonvolatile memory 26 (one or more available blocks), designating an address of the storage location and the password obtained in S701 (S703). The write process is described in detail below.

Next, the access apparatus 1 updates the file system management information, including FAT (305, 306) and the directory entry 308, so that the data stored in the blocks in S703 constitutes the encrypted content file, and writes the updated file system management information to the second nonvolatile memory 26 (S704).

Last, the access apparatus 1 registers a name and the password of the stored encrypted content file in the password management table 141 (S705).

In this manner, in the present embodiment, for the access apparatus 1 to store the encrypted content file into the encryption and recording apparatus 2, the access apparatus 1 designates and records the password, and registers and manages the information (the file name and the password) in the password management table 141 in the access apparatus 1.

Figure 8:
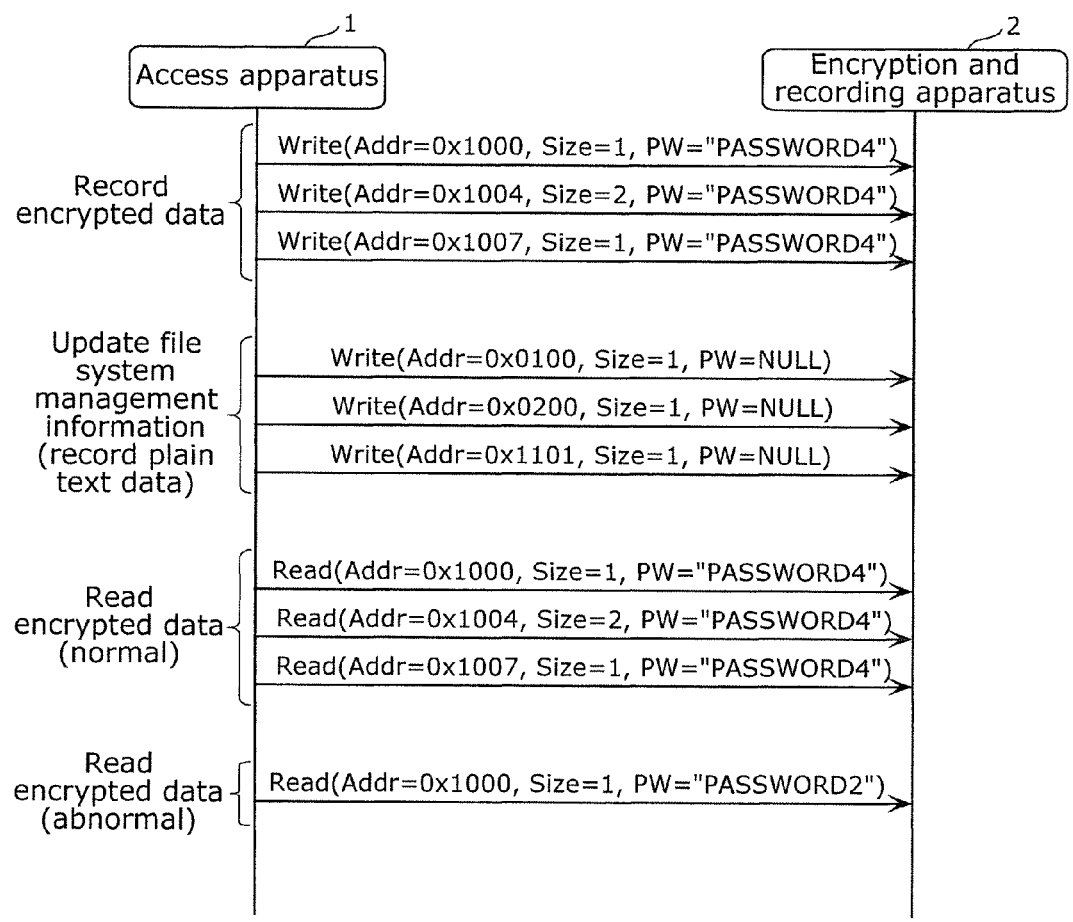
FIG. 8 is a diagram illustrating an example of an encrypted data recording process and a read process according to the embodiment 1.

Next, referring to FIG. 8, an example of an encrypted data recording process according to the embodiment 1 is described. This process corresponds to the process performed in S703 in FIG. 7.

As described with reference to S703, to record data of the encrypted content file into the second nonvolatile memory 26, the access apparatus 1 designates a password, together with a storage location address and its size. When recording, the data of the encrypted content file is further encrypted by the encryption and decryption control unit 231 and recorded as encrypted data into the second nonvolatile memory 26.

The example illustrated in FIG. 8 shows "Write (Addr=0x1000, Size=1, PW="PASSWORD4")" as an example of a write indication. In this example, the write indication means that data having a size "1" is to be recorded, in association with a password "PASSWORD4," into a region starting with an address "0x1000."

Specifically, this recording illustrates an example in which data "/AUDIO/TITLE2.MP3" stored in the password management table 141 of FIG. 5 is to be recorded. Likewise, in the example of FIG. 8, as the continuation of the data, data having a size "2" is to be record into a region starting with an address "0x1004," and further, data having a size "1" is to be record into a region starting with an address "0x1007." Since all the data items are of "/AUDIO/TITLE2.MP3," the same password "PASSWORD4" is designated at this time.

It should be noted that data having a size "n" refers to data having a size corresponding to n blocks.

This sequence of recording process records the data of the encrypted content file as encrypted data #4_1, encrypted data #4_2, encrypted data #4_3, and encrypted data #4_4 into the regions at the addresses "0x1000," "0x1004," "0x1005," and "0x1007," respectively, of the second nonvolatile memory 26 illustrated in FIG. 6B.

At this time, the same password "PASSWORD4" is stored at the respective addresses in the key management table 241 of FIG. 6A. Additionally, the encrypted data #4_1, #4_2, #4_3, and #4_4 are encrypted using block-unique keys associated with the respective addresses in the key management table 241 of FIG. 6A.

In other words, the encrypted data #4_1 is encrypted using a block-unique key "0x103433DA," the encrypted data #4_2 is encrypted using a block-unique key"0x002FD7DC," and so on.

This encrypts the data included in one encrypted content file "/AUDIO/TITLE2.MP3" using different block-unique keys and stores it in the second nonvolatile memory 26.

Thus, for example, to store the same two encrypted content files (the same two data items) into the encryption and recording apparatus 2, different block cipher keys are used for different addresses at which they are stored. Consequently, cryptographic results of the two data items are different.

A block-unique key is different from an encryption and recording apparatus 2 to another, and thus the following advantageous effects are obtained. For example, even if the encrypted content file (the same data) is stored at the same address in two encryption and recording apparatuses 2, cryptographic results of the two encryption and recording apparatus 2 are different. This achieves further enhancement of the security strength.

Next, referring to FIG. 8, an example of a file system management information updating process according to the embodiment 1 is described. This process corresponds to the process of S704 in FIG.

In the process of S704, unlike the process of S703, an invalid password, rather than a valid password, is designated to record data.

For "Update file system management information (record plain text data)" of FIG. 8, a password "NULL" is indicated in a Write command for updating the file system management information, meaning that an invalid password is designated.

As an invalid password, for example, a value such as "0x00" or "0xFF" which is not included in valid ASCII characters may be designated, or a parameter indicating validity of password may be provided separately from a password parameter, and designated.

If an invalid password is designated to record data, the encryption and recording apparatus 2 records the input data as is into the second nonvolatile memory 26, without encrypting it. In the example of FIG. 6B, the data recorded in the regions at the addresses "0x0000" and "0x0001" are "plain text data" not encrypted, and "-" indicative of an invalid password is stored as corresponding passwords of the data in the key management table 241.

This records the file system management information into the second nonvolatile memory 26 without the file system management information being encrypted, which allows all access apparatuses to read the file system management information without designating a password, and properly interpret the file system structure.

Next, referring to FIG. 8, an example of the encrypted data read process according to the embodiment 1 is described.

For "Read encrypted data (normal)" of FIG. 8, the access apparatus 1 directs reading of data (Read), using, as parameters, the same address, the same size, and the same password as used for "Record encrypted data."

If the encryption and recording apparatus 2 receives the read indication, the encryption and decryption control unit 231 refers to the key management table 241 to check if the designated password matches information (a password) stored in the key management table 241. If the designated password matches the information, the encryption and decryption control unit 231 reads encrypted data at a corresponding address in the second nonvolatile memory 26, and decrypts the encrypted data using a block-unique key stored in the key management table 241. The encryption and recording apparatus 2 outputs the decrypted data to the access apparatus 1.

If an incorrect password is designated as indicated in "Read encrypted data (abnormal)" of FIG. 8, the encryption and recording apparatus 2 returns an error, without outputting the data. Alternatively, the encryption and recording apparatus 2 outputs data other than successfully decrypted data, e.g., returning fixed data such as "0x00" or "0xFF," or incorrect data.

As described above, in the embodiment 1, when recording data of an encrypted content file into the encryption and recording apparatus 2, the access apparatus 1 designates and records a password to the encryption and recording apparatus 2, and manages the association between the encrypted content file and the password using the password management table 141.

Further, to record data into the second nonvolatile memory 26, the encryption and recording apparatus 2 encrypts the data using a block-unique key associated with an address of each block and records the data, and manages the association between the address, the block-unique key, and the password using the key management table 241.

This allows the access apparatus 1 to manage each of plural encrypted content files using one password corresponding to the encrypted content files, thereby facilitating the management of the encrypted content files. For example, this allows the access apparatus 1 to readily add and delete an encrypted content file. Further, since data of an encrypted content file yields different results for different addresses and for different encryption and recording apparatuses 2, the security strength can be enhanced.

While the technology disclosed in the present application has been described with reference to the above embodiment 1, it should be noted that the technology according to the present disclosure is not limited to the above embodiment 1. Modifications may be made to the embodiment 1, without departing from the spirit or scope of the technology according to the present disclosure. The numeric values shown in the embodiment 1 are mere illustration, and may be any other values.

Moreover, the above embodiment 1 has been described, with reference to the case where a content file is encrypted using a password in ASCII format. However, the content file may not necessarily be managed in this approach, and may be managed in any other approach.

For example, content may be encrypted using a secret key, instead of a password in ASCII format. The cryptographic algorithm also is not necessarily be limited to specific one, and any of generally employed encryption scheme, such as triple data encryption standard (3DES) or advanced encryption standard (AES) may be used.

There is also no restriction to the sizes (the lengths) of the password and the secret key. The password and the secret key may have any size. This applies not only to the passwords of encrypted content files but also to the block-unique keys stored in the key management table 241. In other words, while the above embodiment 1 has been described with reference to the case where the block-unique keys are each a 4-byte key in binary form, the cryptographic algorithm and the key length may be determined arbitrary. Likewise, block-unique keys may be in any other format, such as passwords in ASCII format.

While the area in the second nonvolatile memory 26 is managed on a per-fixed-length block basis, it may be managed on a per-variable-length block basis. For example, one piece of data may be stored in K blocks, where K is a variable integer greater than 0, and start addresses and size information (the length, the number of blocks, or the end address, for example) of K blocks, and one block-unique key may be associated with one another in the key management table 241.

In the above embodiment 1, the addresses handled by the access apparatus 1 and the encryption and recording apparatus 2 are each expressed as an "address." However, two types of addresses, which are a logical address and a physical address, may be used to manage data.

For example, consider the second nonvolatile memory 26 being a NAND Flash memory. NAND Flash memory is unable to be overridden when data is recorded thereto and therefore required to perform an erase process before recording data. Thus, address translation is necessary, using, for example, an address translation table 401, as shown in FIG. 9, used to translate a logical address and a physical address from one into the other.

In this case, the access apparatus 1 manages a data storage location with a logical address, and manages a region on the second nonvolatile memory 26 with a physical address. For this reason, an address (Addr) designated by the access apparatus 1 in a Write command is a logical address, and the encryption and recording apparatus 2 translates the logical address into a physical address, using the address translation table 401.

Figure 9:
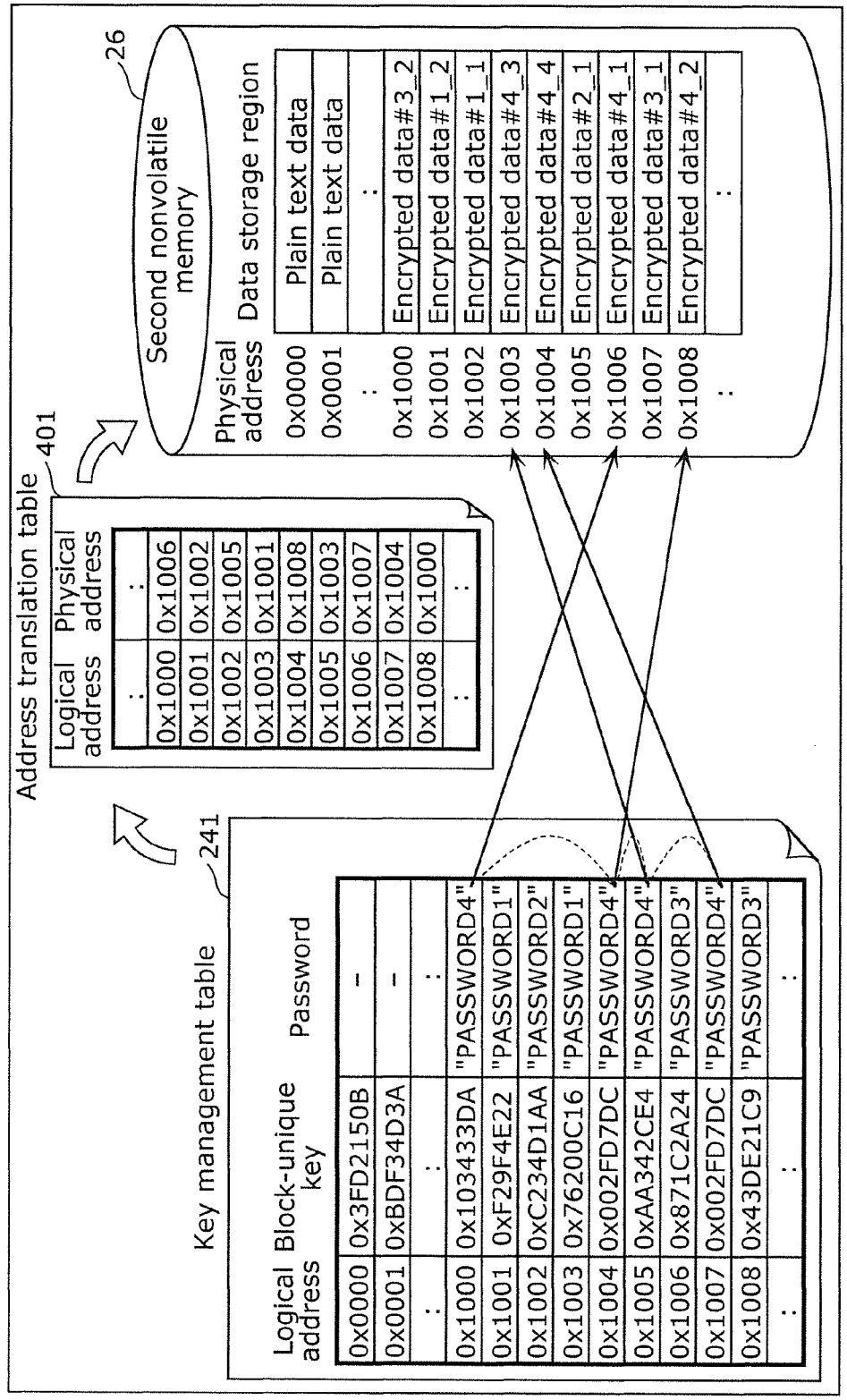
FIG. 9 is a diagram showing examples of the key management table, the second nonvolatile memory, and an address translation table according to the embodiment 1.

In the example of FIG. 9, for example, a logical address "0x1000" is associated with a physical address "0x1006." Thus, data which the access apparatus 1 directs to write to the logical address "0x1000" is in fact stored in a region at the physical address "0x1006" on the second nonvolatile memory 26.

Since the encryption and recording apparatus 2 performs the address translating process using the address translation table 401 as described above, a block-unique key used for each physical address changes each time allocation of a physical address to a logical address is changed. This further enhances the security strength.

The address translating process using the address translation table 401 also allows the first nonvolatile memory 24 and the second nonvolatile memory 26 to be configured in one nonvolatile memory.

For example, only a region (a second region) that is used as the second nonvolatile memory 26 is disclosed as a logical address space to the access apparatus 1, and a region (a first region) used as the first nonvolatile memory 24 is managed with physical addresses only. This can conceal the key management table 241 from the access apparatus 1 so that the access apparatus 1 is prevented from accessing the key management table 241, while managing the first region and the second region on one nonvolatile memory.

For deletion of an encrypted content file from the second nonvolatile memory 26, the access apparatus 1 may direct the encryption and recording apparatus 2 to clear a password of the encrypted content file to instantly disable the access to the encrypted data.

For example, if the access apparatus 1 directs the encryption and recording apparatus 2 to clear the password "PASSWORD4," passwords corresponding to "PASSWORD4" are all cleared from the key management table 241 and placed in a state "Deleted" (passwords corresponding to the addresses "0x1000," "0x1004," "0x1005," and "0x1007"), as shown in the key management table 241 of FIG. 10.

When the access apparatus 1 issues a read indication for an address corresponding to "Deleted," the encryption and recording apparatus 2 outputs no data (or outputs invalid data). This disables the reading of the encrypted data any longer, producing the same effect, for the access apparatus 1, as the encrypted data being instantly deleted.

Further, for clearing the password, the association between the address and the block-unique key may be altered. For example, to alter the association between the address and the block-unique key, block-unique keys associated with two or more addresses corresponding to the password the clearing of which has been indicated may be swapped one another.

Figure 11:
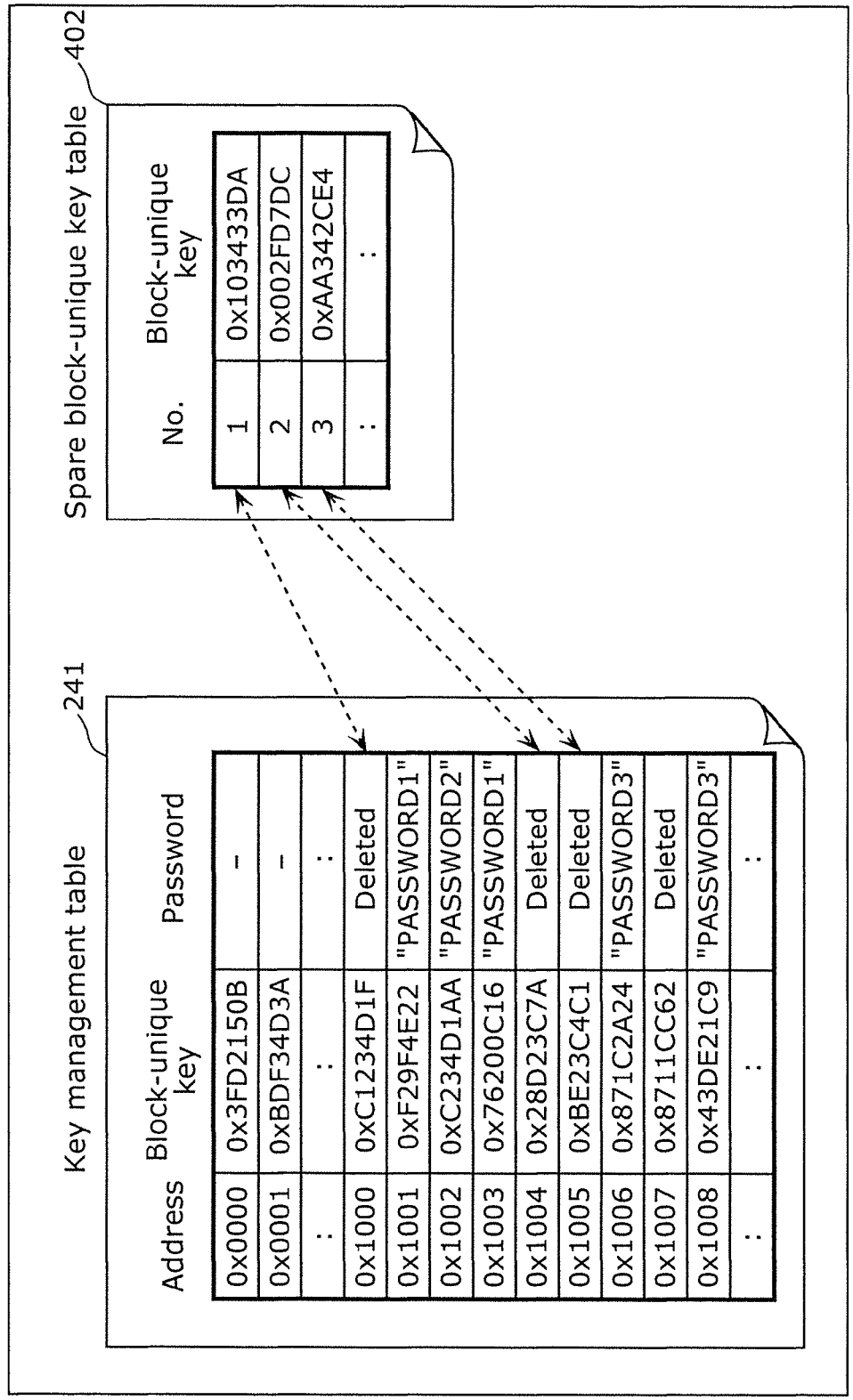
FIG. 11 is a diagram showing another example of the key management table and an example of a spare block-unique key table according to the embodiment 1.

In this approach, however, if the number of addresses corresponding to the password the clearing of which has been indicated is small, the block-unique keys may not be sufficiently swapped one another. Thus, as illustrated in FIG. 11, for example, a spare block-unique key table 402 may be provided in which a plurality of block-unique keys associated with no address are managed. In other words, for the above swapping of block-unique keys, a block-unique key registered in the key management table 241 and a block-unique key in the spare block-unique key table 402 may be swapped.

Specifically, a total number of block-unique keys held by the encryption and recording apparatus 2 is greater than a total number of blocks included in the second nonvolatile memory 26, and the block-unique keys have different values. This allows the swapping of block-unique keys between the key management table 241 and the spare block-unique key table 402, as illustrated in FIG. 11, for example. It should be noted that the spare block-unique key table 402 is held in a region concealed from outside the encryption and recording apparatus 2, such as a region in the first nonvolatile memory 24.

The above embodiment 1 has been described with reference to the case where a content file is encrypted using a password, further encrypted using a block-unique key, and stored in the second nonvolatile memory 26. However, data stored in the encryption and recording apparatus 2 is not necessarily be double encrypted as such, and may be encrypted using a block-unique key only.

For example, the password may be managed by the access apparatus 1 as a mere ID associated one-to-one with a plain content file, rather than as a key to decrypt an encrypted content file. In other words, an identifier identifying the data may be handled as the corresponding information with which the data is associated. In this case, the access apparatus 1 inputs and records a plain content file into the encryption and recording apparatus 2, designating a password as an ID.

In this case, to read the plain content file from the encryption and recording apparatus 2, the ID is required (see "Read encrypted data (normal (abnormal))" in FIG. 8). Thus, only a valid apparatus, such as the access apparatus 1 holding the ID in the password management table 141 is allowed to successfully read the plain content file (obtain data having been decrypted using one or more block-unique keys).

Alternatively, for example, a user or an apparatus which attempts to read encrypted data (data having been encrypted using one or more block-unique keys) stored in the encryption and recording apparatus 2 may be authenticated through any other scheme such as fingerprint authentication.

In other words, the corresponding information associated with data stored in the encryption and recording apparatus 2 may be information identifying (recognizing) the data and may not be a password (a encryption key/a decryption key) used when the data is already encrypted.

Alternatively, a user ID may be employed as a password. In other words, the encrypted content file may not necessarily be a file which is encrypted using a key common to all users, and may be a file which is encrypted using, for example, a user ID unique to each user.

Alternatively, a secure clock may be provided in the encryption and recording apparatus 2 and the encryption and recording apparatus 2 may automatically clear a password in the key management table 241 in a period of time. In doing so, encrypted content files, such as rental content, the right to access which expires in the period of time, can readily be handled.

Moreover, block-unique keys of all blocks (addresses) in a region used to record data in the second nonvolatile memory 26 may be predetermined or may be determined at a time when data is recorded.

In other words, block-unique keys of one or more blocks into which data is to be stored may be determined at a time when the data is written to the second nonvolatile memory 26. In this case, when writing the data, one or more block-unique keys may be read from, for example, master information storing different block-unique keys, and registered to the key management table 241. It should be noted that the master information is held in the region concealed from outside the encryption and recording apparatus 2, such as a region in the first nonvolatile memory 24, for example.

The block-unique keys read from the master information and used to encrypt data may be registered to the key management table 241, as a block-unique keys corresponding to addresses of blocks in which the encrypted data is stored.

An address, a block-unique key, and a password may be corresponded using a plurality of tables (a plurality of pieces of information), rather than one table such as the key management table 241.

For example, any one of an address, a block-unique key, and a password which are corresponding to a file name may be identified, using first information indicating the correspondence between the address and the block-unique key, second information indicating the correspondence between the address and the file name, and third information (e.g., the password management table 141 illustrated in FIG. 5) indicating the correspondence between the file name and the password.

In this case, a combination of the first information, the second information, and the third information constitutes the key management information (information corresponding to the key management table 241 according to the present embodiment).

Here, for example, assume that the file system is managed by the encryption and recording apparatus 2. In this case, if received a content file and a write indication from the access apparatus 1, the encryption and recording apparatus 2 determines an address at which the content file data is to be stored, and holds the second information indicating correspondence between the address and a file name of the content file data.

In this configuration, when the access apparatus 1 reads the content file from the encryption and recording apparatus 2, the second information is referred to in the encryption and recording apparatus 2 and thereby the address corresponding to the file name is identified, for example. A block-unique key corresponding to the address is identified by referring to the first information, and a password corresponding to the address is identified by referring to the third information. Consequently, if the password transmitted from the access apparatus 1 matches the password identified using the third information, the encryption and recording apparatus 2 outputs to the access apparatus 1 the content file data which has been decrypted using the block-unique key identified using the first information.

[Embodiment 2]

An embodiment 2 is to be described, with reference to a case where a variable resistance memory, such as an ReRAM, is used as a first nonvolatile memory 24.

As described in the above embodiment 1, key management table 241 is stored in the first nonvolatile memory 24. Examples of features of the key management table 241 are as follows. First, a plurality of block-unique keys are stored. Second, block-unique keys in the key management table 241 are highly random, and have different values for different encryption and recording apparatuses 2. Third, the access apparatus 1 is unable to read the block-unique keys.

Variable resistance memories have all these features and thus are a suitable medium used as the first nonvolatile memory 24. In the following, details of the variable resistance memory according to the embodiment 2 are to be described, with reference to the accompanying drawings.

[Apparatus Configuration]

Figure 12:
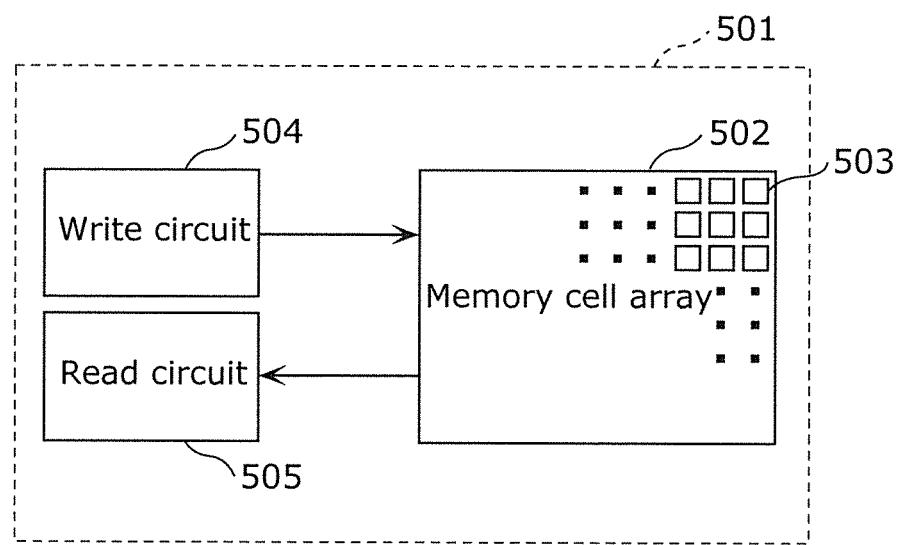
FIG. 12 is a block diagram showing an example of schematic illustration of a variable resistance memory according to an embodiment 2.
Figure 13:
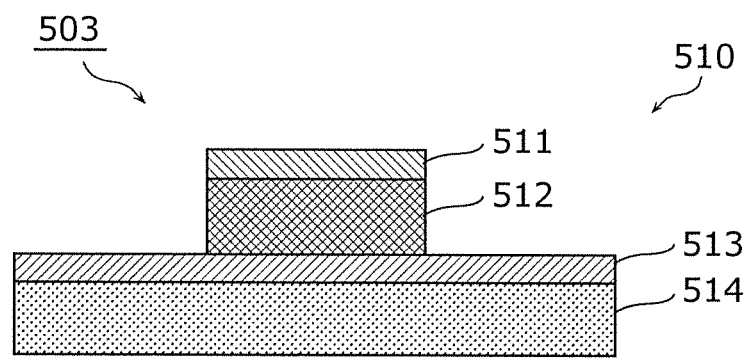
FIG. 13 is a cross-sectional view showing an example of schematic illustration of a memory cell included in the variable resistance memory according to the embodiment 2.
Figure 14:
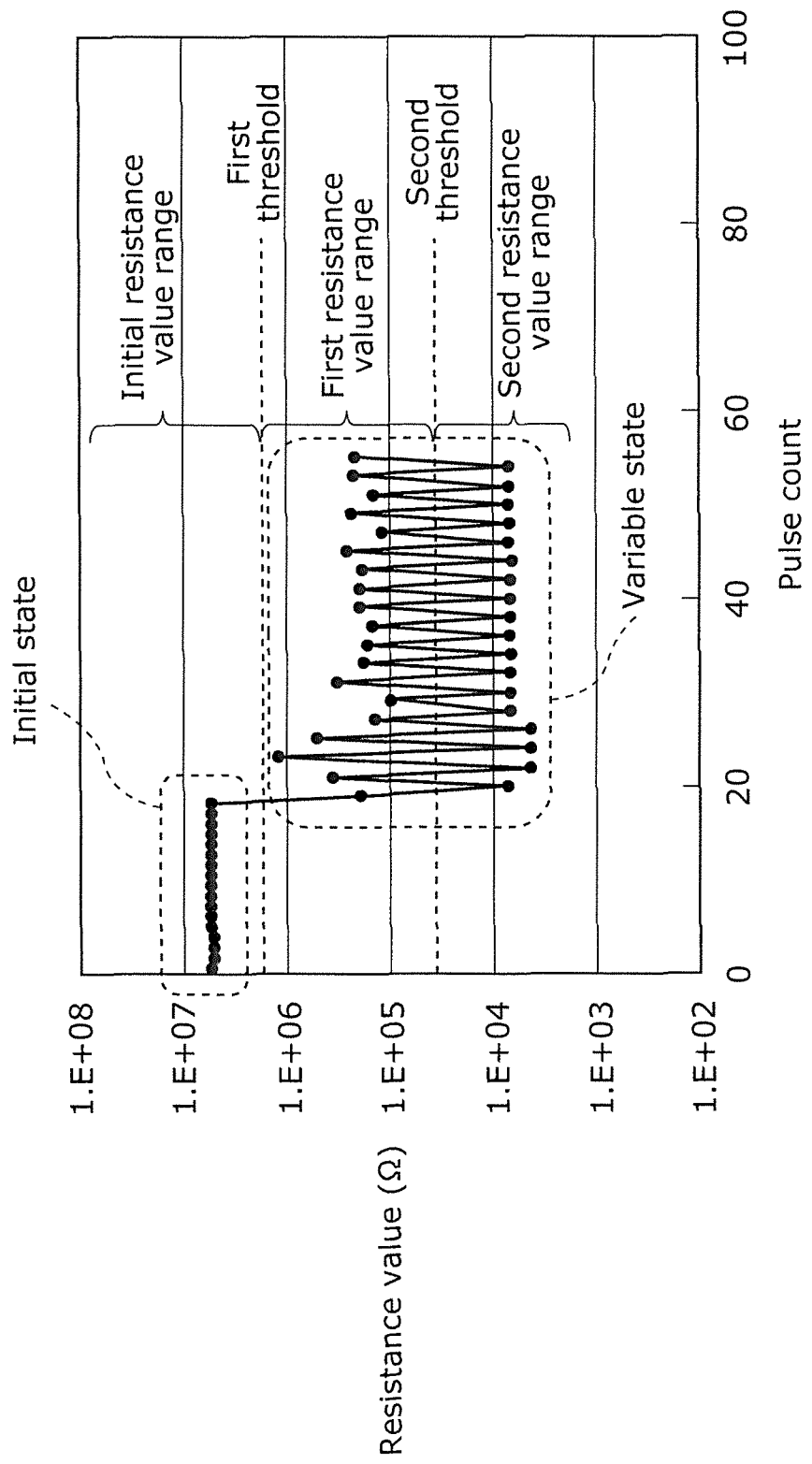
FIG. 14 is a graph depicting an example of resistance value ranges of the memory cells included in the variable resistance memory according to the embodiment 2.

FIG. 12 is a block diagram showing an example of schematic illustration of the variable resistance memory according to the embodiment 2. FIG. 13 is a cross-sectional view showing an example of schematic illustration of a memory cell included in the variable resistance memory according to the embodiment 2. FIG. 14 is a graph depicting an example of resistance value ranges of the memory cells included in the variable resistance memory according to the embodiment 2.

It should be noted that the basic configuration of an encryption and recording system according to the embodiment 2 is the same as the embodiment 1 (see FIG. 1). A feature of the embodiment 2 is that a variable resistance memory 501 is employed as the first nonvolatile memory 24 included in an encryption and recording apparatus 2.

In the example shown in FIG. 12, the variable resistance memory 501 according to the embodiment 2 includes a memory cell array 502, a write circuit 504, and a read circuit 505. It should be noted that one or both of the write circuit 504 and the read circuit 505 may be omitted.

The memory cell array 502 includes a plurality of memory cells 503 arranged in an array.

In the example shown in FIG. 13, a variable resistance element 510 of each memory cell 503 includes an underlying layer 514, a first electrode 513, a variable resistance layer 512, and a second electrode 511.

As depicted in FIG. 14, the memory cells 503 each take either a variable state or an initial state. The variable state refers to a state in which the resistance value of the memory cell 503 can reversibly transition among a plurality of variable resistance ranges in response to application of different electrical signals. The initial state refers to a state in which the resistance value is within an initial resistance value range which overlaps with none of the variable resistance value ranges.

The memory cell 503 in the initial state does not change to the variable state unless a forming stress which is electrical stress for placing the memory cell 503 into the variable state is applied to the memory cell 503. For example, the forming stress may be cumulative stress. In that case, the memory cell 503 transitions from the initial state to the variable state once the cumulative amount of stress has exceeded a predetermined amount.

The plurality of memory cells 503 of the memory cell array 502 include a memory cell 503 in the variable state and a memory cell 503 in the initial state. The memory cell array 502 according to the present embodiment records data, based on a difference for each memory cell 503 as to whether the memory cell 503 is in the initial state or in the variable state.

The memory cells 503, as described above, needs to be subjected to forming after manufacture, otherwise, do not change to a state in which the resistance value reversibly transitions among the plurality of variable resistance value ranges. The forming refers to applying a predetermined electrical stress to a memory cell 503 to place it into a state in which the resistance value reversibly transitions among the plurality of variable resistance value ranges. The electrical stress applied for the forming may be, for example, an electrical pulse having a predetermined voltage and a predetermined time width, or may be a combination of a plurality of electrical pulses.

The initial resistance value range and the variable resistance value ranges can be determined such that a resistance value of the memory cell 503, immediately post manufacture, is within the initial resistance value range, but not within the variable resistance value ranges. The initial resistance value range and the variable resistance value ranges can be determined such that a resistance value of the memory cell 503 having changed to the variable state is within any one of the variable resistance value ranges, but not within the initial resistance value range. It is known that a memory cell that includes a nonvolatile storage element, which is a variable resistance element, can comprise properties regarding the determination of the initial resistance value range, for example. The memory cells 503 having the properties can be manufactured using a variety of known materials.

The memory cell 503 in the initial state includes one in a state under some electrical stress not the forming stress which is the electrical stress for placing the memory cell 503 into the variable state. The memory cell 503 in the variable state includes one in which the resistance value has changed form one immediately post manufacture, by being subjected to some electrical stress not the forming stress.

The read circuit 505 according to the present embodiment reads data recorded in the selected memory cell 503 by determining whether a selected memory cell 503 is in the initial state or in the variable state.

The element in the example depicted in FIG. 14 includes the first electrode 513 comprising tantalum nitride (TaN), the second electrode 511 comprising iridium (Ir), and the variable resistance layer 512 comprising tantalum oxide. The variable resistance layer 512 has an entire thickness of 50 nm or less and has a structure comprising two layers having different oxygen concentrations.

The layer of the variable resistance layer 512, which is in contact with the first electrode 513, has low oxygen concentration, and a composition represented by $TaO_x$ where $0<x<2.5$. The layer of the variable resistance layer 512 which is in contact with the second electrode 511 has high oxygen concentration, a composition represented by $TaO_y$ where $y \geq 2.1$ and a thickness of about 5.5 nm. The area of the contact surface between the first electrode 513 and the variable resistance layer 512 and the area of the contact surface between the second electrode 511 and the variable resistance layer 512 are each 0.25 $\mu m^2$ or less.

The forming stress cumulatively applies a pulse having a voltage of +3.5 V and a pulse width of 5 μSec. A low resistance writing pulse (a pulse for changing a resistance value of the element in a first resistance value range to be in a second resistance value range: a second electrical signal) has a voltage of −2.4 V, and a pulse width of 50 nSec. A high resistance writing pulse (a pulse for changing a resistance value of an element in the second resistance value range to be in the first resistance value range: a first electrical signal) has a voltage of +1.8 V, and a pulse width of 50 nSec. It should be noted that the voltage is positive when a positive voltage, using the first electrode 513 as a reference, is applied to the second electrode 511.

Another example of the variable resistance element 510 is illustrated in which the first electrode 513 and the second electrode 511 comprises platinum (Pt), the variable resistance layer 512 comprises hafnium oxide, the variable resistance layer 512 has a thickness of 30 nm, and an element region is in a round shape having a diameter of 3 μm.

If the variable resistance layer 512 is $HfO_{1.6}$, the initial resistance value is a few MΩ, a high resistance value range is about 1000Ω to about 3000Ω, and a low resistance value range is about 100Ω to about 300Ω. In this case, the forming stress cumulatively applies a pulse having, for example, a voltage of 2 V to 3 V and a pulse width of 100 nSec. The low resistance writing pulse has a voltage of +1.0 V and a pulse width of 100 nSec. The high resistance writing pulse has a voltage of −1.3 V and a pulse width of 100 nSec.

In the example depicted in FIG. 14, the lower limit of the initial resistance value range is greater than or equal to the upper limits of all the variable resistance value ranges. Specifically, the lower limit of the initial resistance value range may be greater than or equal to the upper limit of a variable resistance value range which includes the greatest resistance value among the plurality of variable resistance value ranges. More specifically, the lower limit of the initial resistance value range may be equal to the upper limit of the first resistance value range, among the two variable resistance value ranges, which includes the greatest resistance value.

In the example depicted in FIG. 14, a first threshold is less than or equal to the lower limit of the initial resistance value range and greater than or equal to the upper limit of the variable resistance value range which includes the greatest resistance value among the plurality of variable resistance value ranges. Specifically, the first threshold may be the lower limit of the initial resistance value range and may be the upper limit of the variable resistance value range which includes the greatest resistance value among the plurality of variable resistance value ranges. More specifically, the first threshold may be equal to the upper limit of the first resistance value range, among the two variable resistance value ranges, which includes the greatest resistance value. It should be note that the resistance value equal to the first threshold may be within the initial resistance value range or may be within the variable resistance value range which includes the greatest resistance value among the plurality of variable resistance value ranges.

In the example depicted in FIG. 14, a second threshold is less than or equal to the lower limit of the variable resistance value range which includes the greatest resistance value among the plurality of variable resistance value ranges, and greater than or equal to the upper limit of a variable resistance value range which includes the least resistance value among the plurality of variable resistance value ranges. Specifically, the second threshold may be less than or equal to the lower limit of the first resistance value range, among the two variable resistance value ranges, which includes the greatest resistance value, and greater than or equal to the upper limit of the second resistance value range, among the two variable resistance value ranges, which includes the least resistance value.

More specifically, the second threshold may be equal to the lower limit of the first resistance value range and the upper limit of the second resistance value range. It should be noted that the resistance value equal to the second threshold may be within a resistance value range which includes a resistance value greater than the second threshold or may be within a resistance value range which includes a resistance value less than the second threshold, among the plurality of variable resistance value ranges.

Depending on the configuration of the memory cell 503, the memory cell 503, immediately post manufacture, may have a resistance value less than any one of the variable resistance value ranges. In other words, the initial resistance value range may be lower than the variable resistance value ranges.

Specifically, for example, the above characteristics are achieved if the memory cells 503 each include a variable resistance element having a variable resistance layer comprising iron oxide. More specifically, the resistivity of iron oxide increases from $Fe_3O_4$ to FeO to $Fe_2O_3$. For example, the variable resistance element can be configured in which the first electrode 513 comprises platinum (Pt), the second electrode 511 comprises platinum (Pt), the variable resistance layer 512 comprises $Fe_3O_4$, and the variable resistance layer 512 has the entire thickness of 50 nm or less.

If the contact surface between the first electrode 513 and the variable resistance layer 512 and the contact surface between the second electrode 511 and the variable resistance layer 512 are each 0.25 $\mu m^2$ or less, the initial resistance value is generally 200Ω, exhibiting fairly low resistance. When a pulse having a pulse width of 10 μSec, the same polarity as the first electrical signal, and a voltage the absolute value of which is 3.5 V is applied a predetermined number of times to the memory cell 503 in the initial state, the memory cell 503 shifts to a state in which a resistance value is greater than the initial resistance value (a high resistance state where the memory cell 503 has a resistance value of 2 K to 8 KΩ). This is considered to be due to a fact that oxidation of the contact interface between the second electrode 511 and the variable resistance layer 512 proceeds and an insulated resistive layer comprising $Fe_2O_3$ is formed. This allows the memory cell 503 to, thereafter, shift to the second resistance value range from 300Ω to 500Ω, in response to application of the second electrical signal having a voltage the absolute value of which is 2.4 V, and to the first resistance value range from 2 K to 8 KΩ, in response to application of the first electrical signal having a different polarity from the second electrical signal and a voltage the absolute value of which is 2.4 V.

Another example of the variable resistance element 510 is illustrated in which the first electrode 513 and the second electrode 511 comprise platinum (Pt), the variable resistance layer 512 comprises hafnium oxide, the variable resistance layer 512 has a thickness of 30 nm, and an element region is in a round shape having a diameter of 3 μm.

If the variable resistance layer 512 is $HfO_{0.9}$ and does not change its resistance when the variable resistance layer 512 is in the initial state, the variable resistance layer 512 changes to the variable state in response to application of a pulse having a voltage of 4 V and a long pulse width of 100 μSec as the forming stress. A resistance value of the memory cell 503 in the variable state transitions to fall in the low resistance value range from about 30Ω to about 90Ω in response to application of the low resistance writing pulse having a voltage of −1.3 V and a pulse width of 100 nSec, and shift to fall in the high resistance value range from about 100Ω to about 300Ω in response to application of the high resistance writing pulse having a voltage of +2.0 V and a pulse width of 100 nSec.

In such a configuration, the upper limit of the initial resistance value range may be less than or equal to the lower limits of all the variable resistance value ranges. Specifically, the upper limit of the initial resistance value range may be less than or equal to the lower limit of the variable resistance value range which includes the least resistance value among the plurality of variable resistance value ranges. More specifically, the upper limit of the initial resistance value range may be equal to the lower limit of the second resistance value range, among the two variable resistance value ranges, which includes the least resistance value.

The first threshold may be greater than or equal to the upper limit of the initial resistance value range and less than or equal to the lower limit of the resistance value range which includes the least resistance value among the plurality of variable resistance value ranges. Specifically, the first threshold may be the upper limit of the initial resistance value range and the lower limit of the resistance value range which includes the least resistance value among the plurality of variable resistance value ranges. More specifically, the first threshold may be equal to the lower limit of the second resistance value range which includes the least resistance value among the two variable resistance value ranges.

The second threshold may be greater than or equal to the upper limit of the variable resistance value range which includes the least resistance value among the plurality of variable resistance value ranges, and less than or equal to the lower limit of the variable resistance value range which includes the greatest resistance value among the plurality of variable resistance value ranges. Specifically, the second threshold may be greater than or equal to the upper limit of the second resistance value range, among the two variable resistance value ranges, which includes the least resistance value, and less than or equal to the lower limit of the first resistance value range, among the two variable resistance value ranges, which includes the greatest resistance value. More specifically, the second threshold may be equal to the lower limit of the first resistance value range and the upper limit of the second resistance value range.

It should be noted that the upper limit of one of adjacent resistance value ranges and the lower limit of the other need not necessarily coincide with each other, and a predetermined margin may be permitted between the adjacent resistance value ranges.

The read circuit 505 may read recorded data by selectively executing a first read mode in which whether a resistance value of a selected memory cell 503 is greater than the first threshold is determined, and a second read mode in which whether a resistance value of a selected memory cell 503 is greater than the second threshold.

The record data may include first-type data and second-type data, the first-type data being recorded, based on a difference for each memory cell 503 as to whether the memory cell 503 has a resistance value in the initial resistance value range or not, the second-type data being recorded, based on a difference for each memory cell 503 as to whether the memory cell 503 has a resistance value in at least one of the variable resistance value ranges or not, rather than based on the difference as to whether the memory cell 503 has the resistance value in the initial resistance value range or not.

In this case, the memory cell array 502 may include a first write address region and a second write address region, wherein the first-type data is recorded in the first write address region and the second-type data is recorded in the second write address region.

The first write address region and the second write address region may not necessarily be separate physical regions. For example, the memory cells 503 may be classified into the first write address region and the second write address region, according to a predetermined rule for each address.

The second write address region is a region formed of a plurality of memory cells 503 which are in the variable state, for example. Thus, the second write address region is formed by applying the forming stress to memory cells 503 which are included in a predetermined region, among the plurality of memory cells 503 in the initial state included in the memory cell array 502 (post manufacture memory cell array 502, for example).

Thus, in addition to recording the first-type data, the application of the forming stress to the memory cell array 502 forms the second write address region for writing the second-type data.

The selective application of the forming stress to the plurality of memory cells 503 included in the memory cell array 502 forms the first write address region and the second write address region. This allows flexibility in choice of capacity allocation and arrangements of these address regions. Also, the application of the forming stress to a portion of the first write address region can change the portion into the second write address region.

Since the first write address region and the second write address region are formed in the same memory cell array 502, the confidentiality of information is enhanced even when the information is exchanged between the first write address region and the second write address region, for example.

In the example depicted in FIG. 14, specifically, for example, the first-type data may be recorded, based on a difference for each memory cell 503 as to whether the memory cell 503 has a resistance value in the initial resistance value range or not, and the second-type data may be recorded, based on a difference for each memory cell 503 as to whether the memory cell 503 has a resistance value within the second resistance value range or not.

While two variable resistance value ranges are shown in the example depicted in FIG. 14, there may be three or more variable resistance value ranges. In other words, the memory cells 503 may be a multi-level memory.

The memory cell 503 in the variable state may transition between N−1 variable resistance value ranges in response to application of different electrical signals, where N is an integer greater than or equal to 3. In this case, multi-level data may be recorded, based on a difference for each memory cell 503 as to whether the memory cell 503 in the memory cell array 502 has a resistance value included or not in N resistance value ranges including the initial resistance value range and the N−1 variable resistance value ranges. FIG. 14 depicts an example where N=3. N may be an integer greater than or equal to 4.

Where N is an integer greater than or equal to 3, M1 is a positive integer less than or equal to N, and M2 is a positive integer less than or equal to N−1, (a) the first-type data may be recorded, based on a difference for each memory cell 503 as to whether the memory cell 503 has a resistance value included or not in any one of M1 resistance value ranges including the initial resistance value range, the M1 resistance value ranges not overlapping one another, (b) the second-type data may be recorded, based on a difference for each memory cell 503 as to whether the memory cell 503 has a resistance value included or not in any one of M2 resistance value ranges not including the initial resistance value range and not overlapping one another, and (c) among M1 resistance value ranges used for recording the first-type data, M1−1 resistance value ranges not including the initial resistance value range each may be the same as any one of M2 resistance value ranges used for recording the second-type data.

Where N is an integer greater than or equal to 3, M1 is a positive integer less than or equal to N, and M2 is a positive integer less than or equal to N−1, (a) the first-type data may be recorded, based on a difference for each memory cell 503 as to whether the memory cell 503 has a resistance value included or not in any one of M1 resistance value ranges including the initial resistance value range, the M1 resistance value ranges not overlapping one another, (b) the second-type data may be recorded, based on a difference for each memory cell 503 as to whether the memory cell 503 has a resistance value included or not in any one of M2 resistance value ranges not including the initial resistance value range and not overlapping one another, and (c') among M1 resistance value ranges used for recording the first-type data, at least any of M1−1 resistance value ranges not including the initial resistance value range may be different from M2 resistance value ranges used for recording the second-type data.

The read circuit 505 may selectively execute the first read mode in which the first-type data is read using a first-type threshold group consisting of M1-1 thresholds, and the second read mode in which the second-type data is read using a second-type threshold group consisting of M2-1 thresholds. In this case, the first-type threshold group may include the first threshold that is less than or equal to the lower limit of the initial resistance value range and greater than or equal to the upper limit of the variable resistance value range, among the plurality of variable resistance value ranges, which includes the greatest resistance value. The thresholds included in the second-type threshold group may all be less than or equal to the lower limit of the variable resistance value range, among the plurality of variable resistance value ranges, which includes the greatest resistance value.

In the example depicted in FIG. 14, the first threshold belongs to the first-type threshold group, and the second threshold belongs to the second-type threshold group.

For the variable resistance element depicted in FIG. 14, the initial resistance value range may be greater than or equal to $2\times10^6\Omega$ and less than $1.0\times10^7\Omega$, and the variable resistance value ranges may respectively be greater than or equal to $5\times10^4\Omega$ and less than $2\times10^6\Omega$ and greater than or equal to $5\times10^3\Omega$ and less than $5\times10^4\Omega$, for example. In this case, the first threshold is $2\times10^6\Omega$, and the second threshold is $5\times10^4\Omega$.

[Configuration of Variable Resistance Element]

The variable resistance element 510 includes the variable resistance layer 512 between the first electrode 513 and the second electrode 511. The variable resistance layer 512 may comprise, for example, metal oxide, and, more specifically, transition metal oxide. The variable resistance element 510 of the memory cell 503 in the variable state has characteristics in which the resistance value between the first electrode 513 and the second electrode 511 reversibly transitions between the plurality of variable resistance value ranges, in response to the application of electrical signals between the first electrode 513 and the second electrode 511.

The variable resistance layer 512 of the variable resistance element 510 of the memory cell 503 in the initial state may provide insulation between the first electrode 513 and the second electrode 511. The insulation may be defined, specifically, as a state in which the resistance value is 2 MΩ or greater.

The variable resistance layer 512 of the variable resistance element 510 may include a layer comprising an insulator. The insulator, specifically, is a material which has the resistivity of 30 Ω·m or greater. As the variable resistance layer 512 of the variable resistance element 510 comprises an insulator, resistive characteristics of the memory cell 503 in the initial state is stability maintained.

The element in the initial state refers to an element which remains in the initial state unless the forming stress, which is the electrical stress for placing the element into the variable state, is applied to the element after the element is manufactured by a semiconductor process or the like, and which has a resistance value in the initial resistance value range overlapping with none of the variable resistance value ranges.

The variable resistance element in the initial state does not easily change to the variable state unless the forming stress is applied. This allows data to be stably held in the memory cell 503, based on a difference of the variable resistance element between when it is in the initial state and when it is in the variable state. Moreover, unlike the variable resistance element in the variable state in which a resistance value of the variable resistance element changes in response to application of an electrical signal, the initial resistance value range is adjustable to some extent, depending on a material, size, shape, and manufacturing conditions of the variable resistance element, for example. In particular, since the variable resistance layer 512 has a layered structure, the initial resistance value range is arbitrary adjustable depending on a thickness of the layer having high oxygen concentration and the oxygen concentration when the layer is formed.

The initial resistance value range can be, for example, a range of resistance values obtained when voltages less than those of the electrical signal and the forming stress are applied to the element in the initial state, the electrical signal being for changing, between the plurality of variable resistance value ranges, a resistance value of an element in the variable state.

It should be noted that the forming stress is determined by, for example, the pulse width and an amount of amplitude of a voltage applied to the memory cell 503, and the cumulative time of application, and values of these are different for different memory cells 503 in the memory cell array 502. The cumulative time of application refers to, for example, a total sum of widths of the electrical pulse applied until the resistance state changes from the initial state to the variable state. Thus, specific parameters defining minimum required electrical stress as the forming stress are, for example, the voltage and the pulse width of electrical stress applied until an element of each target memory cell 503 changes to the variable state, and the cumulative time of application. The parameters have certain variations, rather than being absolutely fixed values.

It should be noted that the forming stress is, in general, more intense than the electrical signal which is applied to reversibly change a resistance value of a memory cell in the variable state among the plurality of variable resistance value ranges. Specifically, the forming stress can be greater, in at least one of absolute value of the voltage, pulse width, and cumulative time of application, than the electrical signal which is applied to change the resistance value of a variable state memory cell in the variable state.

A variable resistance element, the resistance value of which changes when the electrical signals having the same polarity and different voltages and different pulse widths, etc., are applied when in the variable state, is referred to as a unipolar variable resistance element. More Specifically, for example, the resistance value of such a variable resistance element changes to a predetermined high resistance level (the first resistance value range: also referred to as an HR level) when the electrical signal (the electrical pulse) having a voltage of +2 V and a width of 1 μs is applied in a direction in which the current flows from the second electrode 511 to the first electrode 513. Likewise, the resistance value of the variable resistance element changes to a predetermined low resistance level (the second resistance value range: also referred to as an LR level) when the electrical signal having a voltage of +4 V and a width of 50 ns is applied in a direction in which the current flows from the second electrode 511 to the first electrode 513. Such a variable resistance element the resistance value of which reversibly changes in response to the application of electrical signals having forward polarities is referred to as a unipolar variable resistance element.

On the other hand, a variable resistance element, the resistance value of which changes when the electrical signals having different polarities are applied when in the variable state, is referred to as a bipolar variable resistance element. More Specifically, the resistance value of such a variable resistance element changes to a predetermined high resistance level (the first resistance value range: also referred to as an HR level) when the electrical signal having a voltage of +2 V and a width of 50 ns is applied in a direction in which the current flows from the second electrode 511 to the first electrode 513. On contrary, the resistance value of the variable resistance element changes to a predetermined low resistance level (the second resistance value range: also referred to as the LR level) when the electrical signal having a voltage of +2 V and a width of 50 ns is applied in a direction in which the current flows from the first electrode 513 to the second electrode 511. Such a variable resistance element the resistance value of which reversibly changes in response to the application of electrical signals having reverse polarities is referred to as a bipolar variable resistance element.

It is understood that, to stabilize the operation of the bipolar variable resistance element, for example, in addition to the polarities, pulse widths or values of voltages of the electrical signal applied to change the bipolar variable resistance element to the HR level (also referred to as changing to the high resistance state) and the electrical signal applied to change the bipolar variable resistance element to the LR level (also referred to as changing to the low resistance state) may be different.

The variable resistance layer 512 may comprise metal oxide. The variable resistance layer 512 may include a layer comprising oxygen-deficient metal oxide. The metal oxide included in the variable resistance layer 512 may be at least either one of transition metal oxide and aluminum oxide, or may be at least one of tantalum oxide, iron oxide, hafnium oxide, and zirconium oxide.

The material of the variable resistance layer of the unipolar variable resistance element may be titanium (Ti) oxide, nickel (Ni) oxide, or aluminum (Al) oxide, for example. The material of the variable resistance layer of the bipolar variable resistance element may be tantalum (Ta) oxide, hafnium (Hf) oxide, aluminum (Al) oxide, or iron (Fe) oxide, for example.

Even if oxide of the same material is used, both the unipolar variable resistance element and the bipolar variable resistance element may be obtained, depending on a combination with electrode materials, and a layered structure of the oxide, for example. The variable resistance layer comprising tantalum oxide brings good characteristics of the variable resistance element, and thus the details are to be illustrated below.

The first electrode 513 and the second electrode 511 may comprise iridium (Ir), platinum (Pt), tungsten (W), copper (Cu), aluminum (Al), titanium nitride (TiN), tantalum nitride (TaN), or titanium aluminum nitride (TiAlN), for example.

While in the example shown in FIG. 13, the first electrode 513 is, but not limited to be, larger in area than the second electrode 511. For example, the first electrode 513 can be formed in a best-suited shape, accordingly, depending on a semiconductor process, such as applying a portion of the first electrode 513 to a line. The underlying layer 514, similarly, can be omitted or modified, accordingly, depending on a semiconductor process.

The variable resistance layer 512 may have a layered structure including at least two layers which are a first variable resistance layer connected to the first electrode 513 and a second variable resistance layer connected to the second electrode 511.

The first variable resistance layer can comprise first metal oxide of oxygen-deficient, and the second variable resistance layer can comprise second metal oxide that has smaller oxygen deficiency than the first metal oxide. The second variable resistance layer may comprise an insulator. The second variable resistance layer has a micro local region formed therein, where the oxygen deficiency reversibly changes in response to application of an electrical pulse. It is contemplated that the local region includes a filament formed of oxygen defect sites. The local region may be a conductive path through the second variable resistance layer. The insulator may comprise metal oxide, and the conductive path may comprise oxygen-deficient metal oxide having low oxygen content than the insulator.

The "oxygen deficiency" refers to a percentage of deficiency of oxygen in metal oxide relative to an amount of oxygen included in oxide which has the stoichiometric composition (if there is a plurality of stoichiometric compositions, a stoichiometric composition in which the resistance value is the highest). Metal oxides having stoichiometric compositions are more stable and have higher resistance values than metal oxides that have other compositions.

For example, when the metal is tantalum (Ta), oxide which has a stoichiometric composition by the above definition is represented by $Ta_2O_5$, and thus can be represented by $TaO_{2.5}$. The oxygen deficiency in $TaO_{2.5}$ is 0%, and the oxygen deficiency in $TaO_{1.5}$ is as follows: oxygen deficiency=(2.5−1.5)/2.5=40%. Oxygen-excessive metal oxide has oxygen deficiency of a negative value. It should be noted that, unless otherwise indicated herein, description is to be given, assuming that the oxygen deficiency includes positive values, zero, and negative values.

Oxide having small oxygen deficiency has a high resistance value because the oxide is closer to oxide that has a stoichiometric composition. Oxide having large oxygen deficiency has a low resistance value because the oxide is closer to a metal included in oxide.

"Oxygen content percentage" is the number of oxygen atoms as a percentage of the total number of atoms. For example, an oxygen content percentage of $Ta_2O_5$ is the number of oxygen atoms as a percentage of the total number of atoms (O/(Ta+O)), which is 71.4 atm %. Thus, an oxygen content percentage of oxygen-deficient tantalum oxide is greater than 0 atm % and less than 71.4 atm %. For example, when a metal included in the first metal oxide and a metal included in the second metal oxide are the same, the oxygen content percentage corresponds to the oxygen deficiency. In other words, when the oxygen content percentage of the second metal oxide is greater than the oxygen content percentage of the first metal oxide, the oxygen deficiency in the second metal oxide is smaller than the oxygen deficiency in the first metal oxide.

The metal included in the variable resistance layer may be other than tantalum. The metal included in the variable resistance layer may be at least one of a transition metal and aluminum (Al). The transition metal may be tantalum (Ta), titanium (Ti), hafnium (Hf), zirconium (Zr), niobium (Nb), tungsten (W), nickel (Ni), or iron (Fe). Transition metals can adopt multiple oxidization states, and thus different resistance states can be achieved by redox reaction.

For example, when hafnium oxide is used, the resistance value of the variable resistance layer can be stably and rapidly changed when a composition of the first metal oxide is represented by $HfO_x$ where x is 0.9 or greater and 1.6 or less and a composition of the second metal oxide is represented by $HfO_y$ where a value of y is greater than a value of x. In this case, the film thickness of the second metal oxide may be 3 to 4 nm.

If the variable resistance layer comprises zirconium oxide, the resistance value of the variable resistance layer can be stably and rapidly changed if the first metal oxide has a composition represented by $ZrO_x$ where x is 0.9 or greater and 1.4 or less and the second metal oxide has a composition represented by $ZrO_y$ where a value of y is greater than a value of x. In this case, the film thickness of the second metal oxide may be 1 to 5 nm.

A first metal included in the first metal oxide and a second metal included in the second metal oxide may be different metals. In this case, the second metal oxide may have smaller oxygen deficiency, namely, higher resistance than the first metal oxide. Such a configuration allows the voltage applied between the first electrode 513 and the second electrode 511 for resistance change to be distributed greater to the second metal oxide than to the first metal oxide. This facilitates the redox reaction in the second metal oxide.

If the first metal included in the first metal oxide to be the first variable resistance layer and the second metal included in the second metal oxide to be the second variable resistance layer comprise different materials, the standard electrode potential of the second metal may be lower than the standard electrode potential of the first metal. The standard electrode potential represents a characteristic in which the higher the value of the standard electrode potential is the greater resistant the metal has to oxidization. This facilitates the redox reaction in the second metal oxide the standard electrode potential of which is relatively low. The resistance change phenomenon is believed to occur when the resistance value (oxygen deficiency) of the second metal oxide changes due to the filament (a conductive path) being altered by the occurrence of the redox reaction in the micro local region formed in the second metal oxide that is highly resistive.

For example, by using the oxygen-deficient tantalum oxide ($TaO_x$) as the first metal oxide and titanium oxide ($TiO_2$) as the second metal oxide, stable resistance change operation is obtained. Titanium (standard electrode potential=−1.63 eV) is a material that has a lower standard electrode potential than tantalum (standard electrode potential=−0.6 eV). As described above, by using, as the second metal oxide, metal oxide that has lower standard electrode potential than the first metal oxide, the redox reaction in the second metal oxide is more facilitated. As another combination, aluminum oxide ($Al_2O_3$) can be used as the second metal oxide to be a high resistance layer. For example, oxygen-deficient tantalum oxide ($TaO_x$) may be used as the first metal oxide, and aluminum oxide ($Al_2O_3$) may be used as the second metal oxide.

In any of the resistance change phenomenon in the variable resistance layer having the layered structure, the resistance value of the second metal oxide is believed to be changed by the filament (conductive path) in the micro local region being altered by the occurrence of the redox reaction in the micro local region formed in the second metal oxide that is highly resistive.

Specifically, when a positive voltage, using the first electrode 513 as a reference, is applied to the second electrode 511 connected to the second metal oxide, oxygen ions in the variable resistance layer are attracted to the second metal oxide. This causes oxidization reaction in the micro local region formed in the second metal oxide, reducing the oxygen deficiency in the second metal oxide. It is believed that, as a result, the filament is hardly formed in the local region, which increases the resistance value of the second metal oxide.

Conversely, when a negative voltage, using the first electrode 513 as a reference, is applied to the second electrode 511 connected to the second metal oxide, oxygen ions in the second metal oxide are pushed toward the first metal oxide. This causes reduction reaction in the micro local region formed in the second metal oxide layer, increasing the oxygen deficiency in the second metal oxide. It is believed that, as a result, the filament is likely to be formed in the local region, which decreases the resistance value of the second metal oxide.

Figure 15:
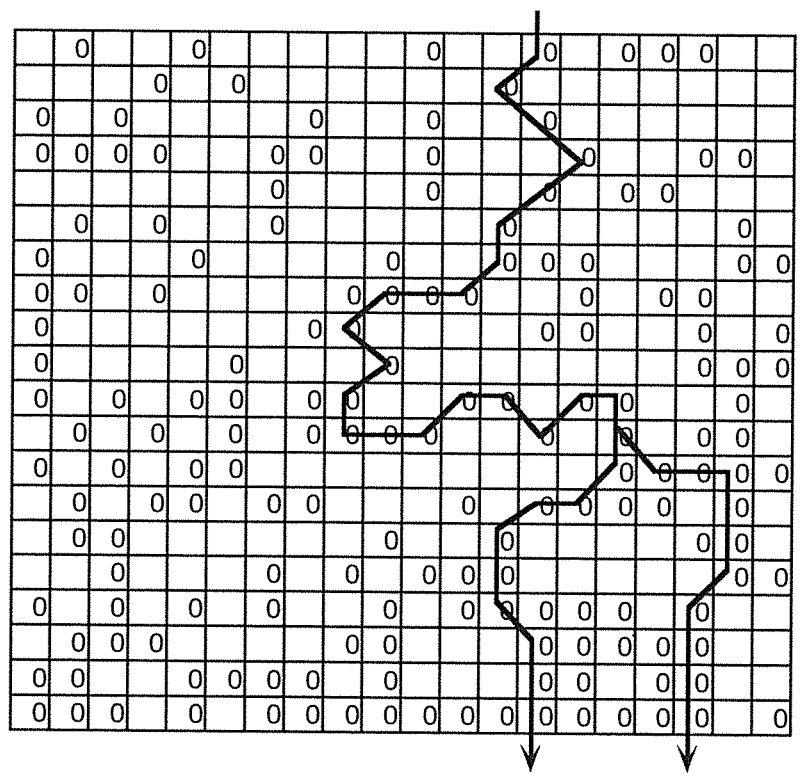
FIG. 15 is a diagram showing an example of a result of simulating filament formation in a variable resistance layer in a percolation model.

FIG. 15 is a diagram showing an example of a result of simulating the filament formation in the variable resistance layer (the local region, for example) in a percolation model. Here, a case is considered in which a filament (a conductive path) is formed of oxygen vacancy sites in the variable resistance layer (hereinafter, simply referred to as "vacancy sites") being connected to one another.

The percolation model is based on the theory that when the density of, for example, the oxygen vacancy sites randomly distributed in the variable resistance layer exceeds a certain threshold, the connection between the vacancy sites is formed. The "vacancy" as used herein refers to oxygen deficient in metal oxide, for example. The "density of vacancy sites" also corresponds to the oxygen deficiency. In other words, the greater the oxygen deficiency is, the greater the density of the vacancy sites is.

In the simulation depicted in FIG. 15, oxygen ion sites in the variable resistance layer are approximately presumed to be regions (sites) partitioned in grid, and the filament formed of vacancy sites, which are probabilistically formed, is obtained by simulation.

In FIG. 15, sites that include "0" represent the vacancy sites formed in the variable resistance layer. On the other hand, empty sites represent sites occupied by oxygen ions, meaning highly resistant regions. A cluster of the vacancy sites indicated by arrows (a collection of vacancy sites connected to one another in top-down, left-right, and diagonal directions in a site range) indicates filaments which are formed in the variable resistance layer when a voltage is applied to the variable resistance layer in the top-down direction in the figure, that is, indicates paths through which a current flows.

As depicted in FIG. 15, the filament which allows a current to flow between the top and bottom surfaces of the variable resistance layer includes a cluster which is formed the vacancy sites and connecting the top end and the bottom end of the randomly distributed vacancy sites. Based on the percolation model, the number of filaments and its shape are probabilistically formed. The number of filaments and the shape represent the variations in resistance value of the variable resistance layer.

The forming corresponds to an operation of forming a filament by changing the density of vacancy sites in metal oxide in a certain area of the variable resistance layer. Specifically, the application of the electrical stress forms a filament connecting between vacancy sites which are sparsely when the memory cell is in the initial state.

As the variable resistance element is formed which includes the variable resistance layer comprising metal oxide, locations of vacancy sites in the variable resistance layer are random depending on a memory cell. Thus, it is contemplated that, even if certain electrical stress were applied to each memory cell, an amount of stress the forming generates varies from one memory cell to another because the maximum distance between vacancy sites, which is a barrier to the filament formation (the connection between the vacancy sites), varies from one memory cell to another. As a result, it is contemplated that when the predetermined electrical stress is applied to the memory cells in the initial state, memory cells 503 the forming on which has been completed arise randomly, among the memory cells.

It is contemplated that the same mechanism explains the occurrence of the forming (the change from the initial state to the variable state) so long as a material is used in which connection of oxygen vacancy sites forms a filament path. Thus, it is inferred that similarly, the number of filaments and the shape are probabilistically formed even if a metallic material included in metal oxide is different, for example. Thus, whether the forming occurs or not when the predetermined electrical stress is applied to the initial state memory cell is determined probabilistically, namely, randomly.

The second electrode 511, connected to the second metal oxide the oxygen deficiency of which is smaller than the second electrode 511, comprises a material, such as platinum (Pt), iridium (Ir), palladium (Pd), which has standard electrode potential higher than a material included the first electrode 513 and a metal included in the second metal oxide.

Moreover, the first electrode 513, connected to the first metal oxide the oxygen deficiency of which is higher than the second metal oxide, may comprise a material, such as tungsten (W), nickel (Ni), tantalum (Ta), titanium (Ti), aluminum (Al), tantalum nitride (TaN), or titanium nitride (TiN), which has lower standard electrode potential than the metal included in the first metal oxide. The standard electrode potential represents a characteristic in which the higher the value of the standard electrode potential is the greater the resistant the metal has to oxidization.

In other words, the relationship between standard electrode potential V2 of the second electrode 511, standard electrode potential Vr2 of the metal included in the second metal oxide, standard electrode potential Vr1 of the metal included in the first metal oxide, and standard electrode potential V1 of the first electrode 513 may satisfy Vr2<V2 and V1<V2. Furthermore, V2>Vr2 and Vr1≥V1 may be satisfied.

According to the above configuration, the redox reaction selectively occurs in the second metal oxide near an interface between the second electrode 511 and the second metal oxide, and stable resistance change phenomenon is obtained.

More preferably, the variable resistance layer 512 at least has a layered structure, including the first variable resistance layer having a composition represented by $TaO_x$ (where $0 \leq x < 2.5$) and the second variable resistance layer having a composition represented by $TaO_y$ (where $x<y<2.5$). Of course, the layered structure can suitably include another layer, for example, a third variable resistance layer comprising metal oxide other than tantalum oxide, for example.

Here, $TaO_x$ may satisfy $0.8 \leq x < 1.9$, and $TaO_y$ may satisfy $2.1 \leq y < 2.5$. A second tantalum-containing layer may have a thickness of 1 nm or greater and 8 nm or less. Stacking layers having different oxygen deficiencies can determine a direction of the resistance change of the bipolar variable resistance element. For example, the second variable resistance layer is disposed closer to the second electrode 511 and the first variable resistance layer is disposed closer to the first electrode 513. In such a configuration, the resistance state of the bipolar variable resistance element changes to the high resistance state when a voltage is applied in a direction in which the current flow from the second electrode 511 to the first electrode 513, and changes to the low resistance state when a voltage is applied in a direction in which the current flows in reverse. When the second variable resistance layer is disposed in contact with the first electrode 513 and the first variable resistance layer is disposed in contact with the second electrode 511, the relationship between the resistance change and the direction of the application of the voltage is, of course, reversed.

[Variable Resistance Element Characteristics]

Figure 16:
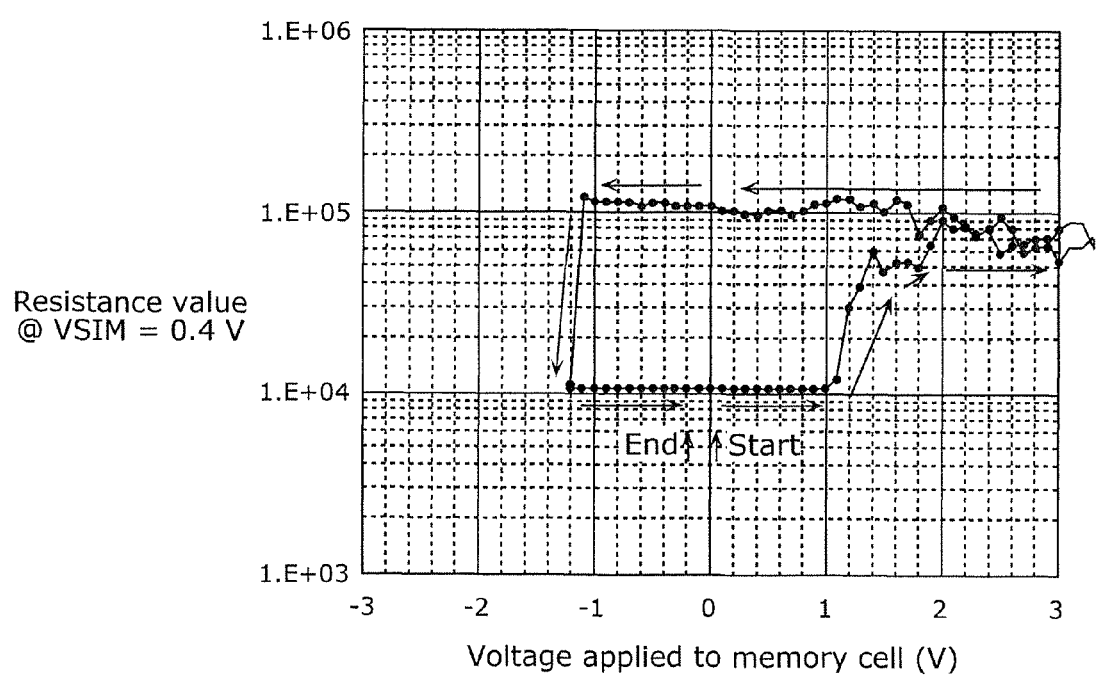
FIG. 16 is a diagram showing an example of a variable state bipolar variable resistance element characteristic.

FIG. 16 is a diagram showing an example of a variable state bipolar variable resistance element characteristic. The element shown in FIG. 16 includes the first electrode 513 comprising TaN, and the second electrode 511 comprising Ir. The variable resistance layer 512 at least has a layered structure including a first tantalum-containing layer having a composition represented by $TaO_x$ (where $0 < x < 2.5$) and the second tantalum-containing layer having a composition represented by $TaO_y$ (where $x < y$). The first tantalum-containing layer is in contact with the first electrode 513 and the second tantalum-containing layer is in contact with the second electrode 511.

More specifically, the variable resistance layer 512 is formed so that $TaO_x$ satisfies $0.8 \leq x \leq 1.9$ and $TaO_y$ satisfies $2.1 \leq y \leq 2.5$. The second tantalum-containing layer has a thickness of 8 nm or less, and the entire thickness of the variable resistance layer 512 is 50 nm or less. The area of contact surface of the variable resistance layer 512 with each electrode is equivalent to that of the variable resistance element used for the measurement in FIG. 14.

Voltages of an electrical signal applied to the variable resistance element are indicated on the horizontal axis in FIG. 16, and resistance values (each resistance value is calculated from a current when a read voltage VR is applied) of the variable resistance element when the electrical signal is applied are indicated on the vertical axis. With gradually increasing a level of voltage from the start point in the figure toward the positive polarity, the resistance value gradually increases once the applied voltage has exceeded +1.1 V, reaching about 100 kΩ when the voltage applied is +2.0 V.

Conversely, the level of voltage gradually decreases toward the negative polarity. It can be seen that as the voltage has exceeded −1.1 V, the resistance value of the variable resistance element is about 10 kΩ, returning to the start value, and the variable resistance element is placed into the low resistance state. At this time, the variable resistance layer 512 includes the second variable resistance layer disposed close to the second electrode 511, and the first variable resistance layer disposed close to the first electrode 513.

The application of the electrical signal where the current flows from the second electrode 511 to the first electrode 513 is defined as positive-polarity application. The positive-polarity application changes the variable resistance element 510 to the HR level. The application of the electrical signal where the current flows in reverse is defined as negative-polarity application. The negative-polarity application changes the variable resistance element 510 to the LR level. FIG. 16 depicts that the variable resistance element 510 can sufficiently reversibly shift between the low resistance state and the high resistance state, using a common power supply voltage if its absolute value satisfies |VH|=|VL|=about 2.0 V, where VH represents a high resistance writing voltage having a voltage level which changes the variable resistance element 510 from LR to HR, and VL represents a low resistance writing voltage having a voltage level which changes the variable resistance element 510 from HR to LR.

Figure 17:
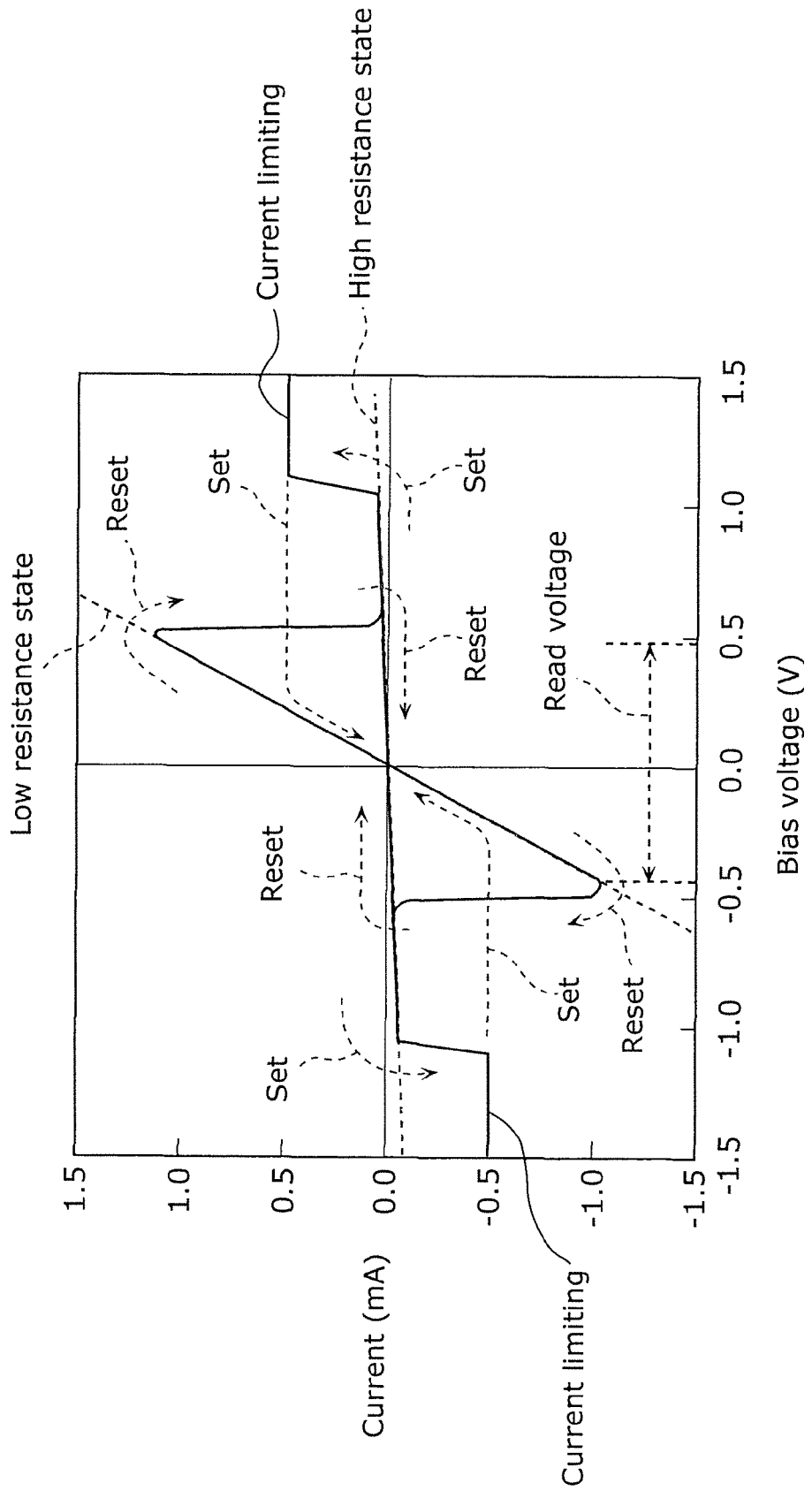
FIG. 17 is a diagram depicting an example of a variable state unipolar variable resistance element characteristic.

FIG. 17 is a schematic view depicting an example of a variable state unipolar variable resistance element characteristic disclosed in non-patent literature (IEDMTechnicalDigest.13-15 Dec. 2004, p. 587).

As indicated in the article, the following is known: the variable resistance element including the variable resistance layer comprising NiO, $TiO_2$, $HfO_2$, or $ZrO_2$ exhibit unipolar properties; the variable resistance layer comprising transition metal oxides of NiO, $TiO_2$, $HfO_2$, or $ZrO_2$, immediately post manufacture, is an insulator, and the process of applying the forming stress to the variable resistance layer forms a conductive path, causing the variable resistance layer to transition to the variable state.

Depending on a material of the variable resistance layer, a combination of the variable resistance layer with electrodes, and impurity doped the variable resistance material, for example, an element, the resistance value of which changes symmetrically in an unipolar manner both on the positive voltage side and the negative voltage side, is obtained. FIG. 17 depicts characteristics of the element.

In the example depicted in FIG. 17, the element shifts to a reset state, namely, the HR level when the absolute value of a bias voltage has exceeded 0.5 V, and the element shifts to a set state, namely, the LR level when the absolute value of the bias voltage has exceeded 1.0 V. By applying electrical signals having the same polarity and different voltages, such an element can be caused to reversibly transition between the two resistance states.

The unipolar variable resistance element having such characteristics as depicted in FIG. 17 can be utilized as a bipolar variable resistance element if control is provided such that the unipolar variable resistance element transitions to the high resistance state by application of a positive polarity electrical signal having a voltage of +0.5 V or greater and less than +1 V, and transitions to the low resistance state by application of a negative polarity electrical signal having a voltage of −1 V or less (the absolute value is 1 V or greater). The technology according to the present disclosure is applicable to both bipolar variable resistance elements and unipolar variable resistance elements.

Depending on a combination of a voltage (the absolute value) and a width of an electrical signal applied, and the number of times the electrical signal is applied, etc., the variable resistance element may be utilized as a multi-level memory a resistance value of which reversibly transitions between three or more variable resistance value ranges. For example, an element comprising tantalum oxide as the variable resistance layer exhibits good characteristics, and is applicable to multi-level memory.

Figure 18:
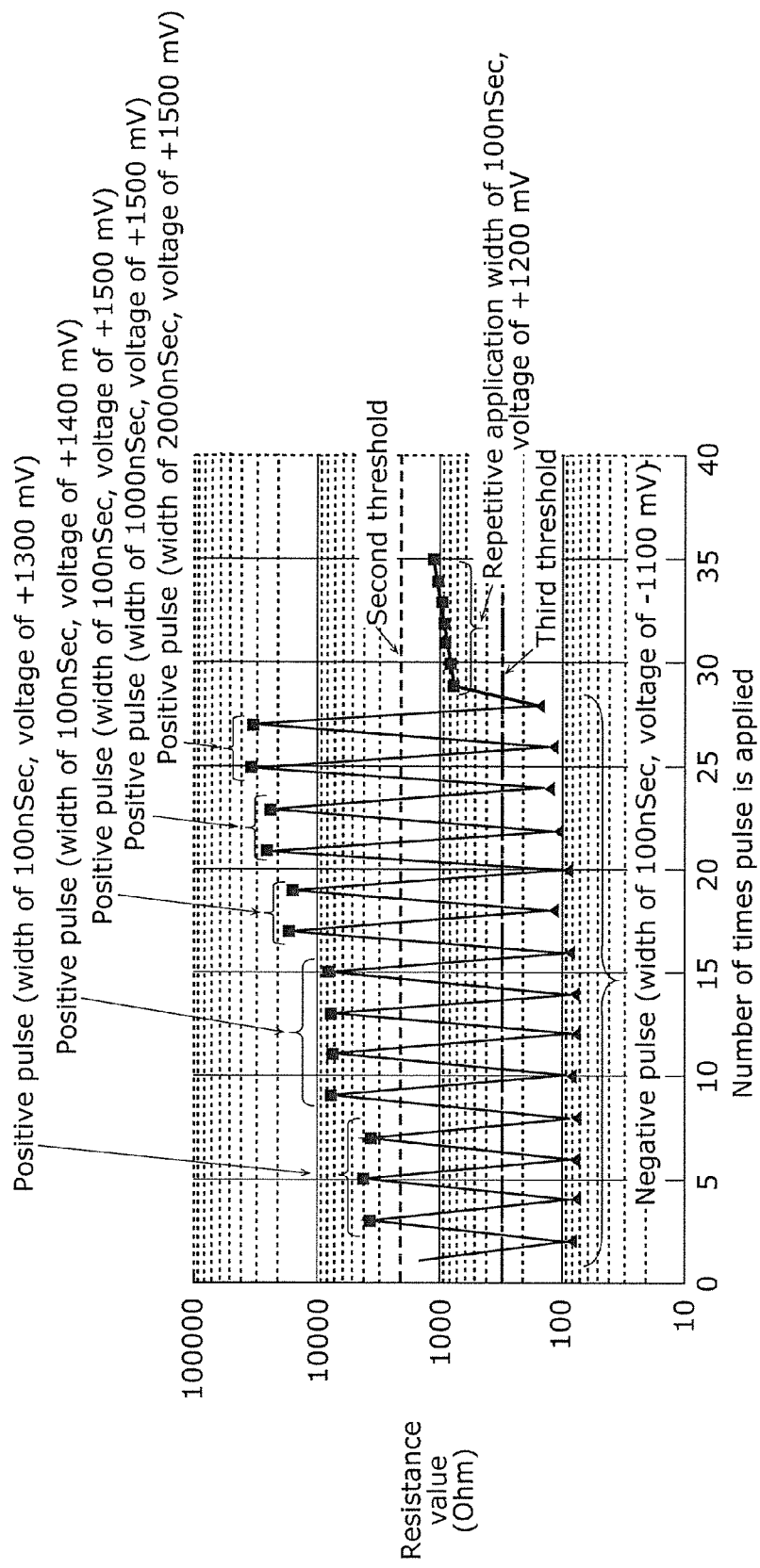
FIG. 18 is a diagram showing an example of resistance-changing properties of the variable resistance element.

FIG. 18 is a diagram showing an example of resistance-changing properties of the variable resistance element. The number of times the pulse (the electrical signal) is applied is indicated on the horizontal axis, and resistance values of the variable resistance element after application of the electrical signal (similar to the above, each resistance value is calculated from a current when the read voltage VR is applied) is indicated on the vertical axis. The triangles (▲) each indicate a resistance value after a negative polarity pulse (the electrical signal) is applied. Squares (■) each indicate a resistance value after a positive polarity pulse (the electrical signal) is applied.

The element shown in FIG. 18 includes the first electrode 513 comprising tantalum nitride (TaN), the second electrode 511 comprising platinum (Pt), the variable resistance layer 512 comprising tantalum oxide having a layered structure. The variable resistance layer 512 has a thickness of 50 nm or less, the contact surface between the first electrode 513 and the variable resistance layer 512 and the contact surface between the second electrode 511 and the variable resistance layer 512 are each 0.25 µm² or below.

Among the layers constituting the variable resistance layer 512, a layer in contact with the first electrode 513 has low oxygen concentration, having a composition represented by $TaO_x$ where $0<x<2.5$. A layer in contact with the second electrode 511, in contrast, has high oxygen concentration, having a composition represented by $TaO_y$ where $y≥2.1$, and a thickness of about 5.5 nm.

As can be seen from the figure, as the pulse voltage increases from 1300 mV to 1500 mV, the resistance value after application of positive polarity pulses gradually increases. As the pulse voltage is fixed to 1500 mV and the pulse width is changed from 100 nSec to 1000 nSec, 2000 nSec, the resistance value after application of positive polarity pulses gradually increases.

As the voltage pulse is applied multiple times while fixing the pulse voltage to a relatively small mount, i.e., 1200 mV, the resistance values after the pulse application increases. It can also be seen that making use of such characteristics allows fine adjustment of the resistance value using a relatively small voltage pulse. In other words, the resistance value of a variable resistance element having such characteristics as depicted in FIG. 18 can controllably be set between three or more variable resistance value ranges.

A sense amplifier, which determines a resistance value based on the second threshold of FIG. 18, determines the memory cells 503 written with positive polarity pulses having voltages of +1300 mV or greater to have resistance values all greater than the second threshold, and outputs binary data of 0 (if resistance values greater than the threshold are defined as digital data of 0).

On the other hand, resistance values of memory cells 503 having written with negative polarity pulses and memory cells 503 having written with a positive polarity pulse having a voltage of +1200 mV and a pulse with of 100 ns are less than the second threshold, and thus the sense amplifier outputs binary data of 1 (if resistance values less than the threshold are defined as digital data of 1). It should be noted that a cell having a resistance value exactly matching with the threshold may be assigned 1 or may be assigned 0.

Furthermore, a sense amplifier, which determines a resistance value based on a third threshold of FIG. 18, determines memory cells 503 having written with positive polarity pulses having a voltage of +1200 mV or greater to have resistance values all greater than the third threshold, and outputs binary data of 0. On the other hand, only resistance values of memory cells 503 having written with negative polarity pulses are less than the third threshold, and thus the sense amplifier outputs binary data of 1.

A combination of output results from two types of sense amplifiers as such allows use of the element shown in FIG. 18 as a ternary memory.

From a cross-section analysis, it is observed that such resistance change of the variable resistance element (an ReRAM element) is caused by generation of a conductive path electrically connecting the second electrode 511 and the first electrode 513 in the variable resistance layer 512. It is found that the conductive path at this time has a diameter of 30 nm to 10 nm or less, which is even less than the width of a line fabricated by advanced fine semiconductor processing. In other words, even if the variable resistance element is fabricated by a super fine semiconductor process which is believed to be the limits of lithographic fabrication, characteristics of the variable resistance element similar to or the same as the above-described characteristics of the variable resistance element are stability maintained.

Moreover, the processing for forming the variable resistance layer of the variable resistance element (an ReRAM element) requires no high-temperature heat treatment higher than several hundred degrees Celsius. This prevents the characteristics of the C-MOS (Complementary-Metal Oxide Semiconductor) transistors from being degraded due to heating process.

In other words, as compared to memory elements including a floating gate transistor, such as Flash memory, the variable resistance element has excellent compatibility with the semiconductor process, and characteristics that the reliability of the resistance change retains as the fine semiconductor processing advances.

Hence, for example, even if a logic circuit, such as a controller, and the variable resistance element are formed on one chip, the variable resistance element is formed while reducing impact on the logic circuit characteristics. Sharing semiconductor process for the logic circuit and the semiconductor process for the variable resistance element achieves reduction in manufacturing cost.

[Operation Modes and Commands]

In the embodiment 2, the variable resistance memory 501 used as the first nonvolatile memory 24 included in the encryption and recording apparatus 2 may have four or more operation modes. In this case, the variable resistance memory 501 may externally receive a command selected from 4 or more commands, and selectively execute four or more operation modes based on the received command.

The variable resistance memory 501 may alternatively execute a first mode and a second mode. In the first mode, data is written to or read from a memory cell 503, based on a difference as to whether the memory cell 503 is in the initial state or in the variable state. In the second mode, data is written to or read from a memory cell 503, based on, rather than the difference as to whether the memory cell 503 has a resistance value within the initial resistance value range or not, a difference as to whether the memory cell 503 has a resistance value in at least one of the variable resistance value ranges or not.

For example, define electrical processing and signals in the example depicted in FIG. 14, as follows: electrical stress as the forming stress, the electrical stress being for changing the memory cell 503 in the initial state to the variable state; an electrical signal as the low resistance writing pulse, the electrical signal being for changing the resistance value of the memory cell 503 in the first resistance value range to fall in the second resistance value range; and an electrical signal as the high resistance writing pulse, the electrical signal being for changing the resistance value of the memory cells 503 in the second resistance value range to fall in the first resistance value range.

Here, define, as a special write mode (a first write mode), a mode in which the write circuit 504 is caused to apply the forming stress to a memory cell 503 selected for input data "1" and caused not to apply the electrical stress to a memory cells 503 selected for input data "0," and define, as a special write command (a first write command), a command for executing the special write mode, which is input external to the variable resistance memory 501.

Define, as a special read mode (the first read mode), a mode in which the read circuit 505 is caused to read data according to the determination based on the first threshold, and define, as a special read command (a first read command), a command for executing the special read mode, which is input external to the variable resistance memory 501.

Define, as a normal write mode (a second write mode), a mode in which the write circuit 504 is caused to apply the low resistance writing pulse (the second electrical signal) to a memory cell 503 selected for the input data "1," and the high resistance writing pulse (the first electrical signal) to a memory cell 503 selected for the input data "0," and define, as a normal write command (a second write command), a command for executing the normal write mode, which is input external to the variable resistance memory 501.

Define, as a normal read mode (the second read mode), a mode in which the read circuit 505 is caused to read data according to the determination based on the second threshold, and define, as a normal read command (a second read command), a command for executing the normal read mode, which is input external to the variable resistance memory 501.

[Examples of Restriction of Access to Data]

In the above configuration, for example, the special write command and the special read command may be possessed only by the manufacturer of the variable resistance memory 501, namely, concealed, while widely publicizing the normal write command and the normal read command in a manual for the variable resistance memory 501, for example.

In this case, for example, the manufacturer of the variable resistance memory 501 writes, via the special write command, plural sets of an address and a block-unique key to the key management table 241, and the encryption and recording apparatus 2 uses the special read command to read the key management table 241. This makes the key management table 241 readable and writable within the encryption and recording apparatus 2, thereby further enhancing the confidentiality of the key management table 241.

It should be noted that passwords (see FIG. 6A) corresponding to individual addresses (block-unique keys) are written to the variable resistance memory 501 by the encryption and recording apparatus 2 via the normal write command. In this case, an address at which a password is to be written is designated by, for example, one of pointers (pointers written in the special write mode) registered in association with respective addresses in the key management table 241.

Alternatively, the passwords corresponding to the individual addresses (the block-unique keys) may be registered to the key management table 241, via the special write command.

If the variable resistance memory 501 having such a high security strength is sealed with a resin or the like, a line or the like ends up being damaged when attempting to apply a probe onto the line within the variable resistance memory 501. Thus, it is impossible to analyze electrical resistance by measuring the electrical resistance. Consequently, unauthorized access to the key management table 241 is impossible unless a command corresponding to the special read command is leaked.

Reliability of data recording by Flash memory used in conventional technology, as a multi-level memory, is reduced as the fine semiconductor processing advances. In particular, if an error occurs in a sequence of bits of key data used for encryption and decryption, such as the content decryption key, data encrypted using the key data can no longer be read out at all, and in some cases, significant damage strikes that the encryption and recording apparatus 2 is not even accessible. Thus, fairly reliable recording of the key data is demanded.

In contrast, the high reliability of the variable resistance memory 501, which includes the memory cells 503 each including the variable resistance element, is even retained as an advance in fine semiconductor processing. In particular, as the variable resistance element changes its resistance state due to the formation of a filament in the variable resistance layer, the local region in which the filament is formed is sufficiently smaller than the element size. This reduces adversely effects on the resistance-changing properties as an advance in size reduction of the element. Thus, for example, the key data mentioned above is recorded with high reliability.

Moreover, a controller circuit, which performs at least one of the encryption and the authentication, and the variable resistance memory 501 may be configured in a mixed chip which is one chip on which they are formed. This can reduce a risk of leakage of the key data due to a signal waveform being peeked on the interface during exchange of the key data between the controller circuit, which performs at least one of the encryption and the authentication, and the variable resistance memory 501. Additionally, the properties of the variable resistance element make it nearly impossible to determine the resistance state by physical analysis, preventing the key data from physically being stolen.

To mount Flash memory used in conventional technology and the controller circuit on one chip, the fabricating process of Flash memory requires semiconductor process steps separate from C-MOS processing used for the logic circuit, ending up increasing the manufacturing cost due to an increased number of process steps. Furthermore, the fabricating process of Flash memory requires high-temperature heat treatment, which has impact on semiconductor properties of C-MOS processing used for the logic circuit, ending up imposing a large number of constraints on maintaining the performance of transistor properties.

In contrast, the variable resistance memory 501 which includes a memory array 502 formed of the memory cells 503 utilizing the variable resistance elements requires no high-temperature heat treatment during the fabrication process, and thus has no effect on semiconductor properties of C-MOS processing. Consequently, forming the controller circuit and the variable resistance memory 501 on one chip enhances the confidentiality of the key data, without impairing characteristics of the logic circuit such as the controller circuit, or without incurring high cost of the fabricating process.

While the above example has been described where two special operation modes and two special commands and two normal operation modes and two normal commands are employed, the number and the combination of the operation modes and commands are not limited thereto.

If seven levels of the resistance value of the variable state memory cell 503 can be set as depicted in FIG. 18, the special write mode including the initial state may write 3-bit data using eight levels, whereas the normal write mode not including the initial state may write 2-bit data using four levels. A combination of levels of the resistance value used to write data can be selected accordingly, depending on a system used.

[Randomness of Change to Variable State in Response to Application of Forming Stress]

The act of changing a resistance value of an element in the initial state in the initial resistance value range to fall in a predetermined variable resistance value range is referred to as a forming process or a forming write.

As stated above, a voltage and a pulse width of the electrical signal for changing the variable resistance element to the high resistance state in order to record "0" in the normal write mode are represented by VH and TPH, respectively, and a voltage and a pulse width of the electrical signal for changing the variable resistance element to the low resistance state in order to record "1" in the normal write mode are represented by VL and TPL, respectively.

Assume that the voltage of electrical stress used to perform the forming write is represented by VF, and the pulse width is represented by TPF, where satisfying |VF|>|VH| and |VF|>|VL| is a condition 1, and satisfying TPF>TPH and TPF>TPL is a condition 2. Write conditions may satisfy at least one of the conditions 1 and 2. In other words, the forming write may have characteristics in that the forming process is not allowed under the write conditions in the normal write mode.

Referring to the pulse width, a predetermined forming process is not completed by a single application of the electrical stress although TPF>TPH and TPF>TPL are satisfied, the electrical stress may be applied a number of times to complete the forming process. At this time, the electrical stress may be repeatedly applied. In the course of repeated application of the electrical stress, the voltage applied may be gradually increased by a predetermined incremental. In the course of repeated application of the electrical stress, the pulse width may be gradually increased by a predetermined incremental or a predetermined amplification factor.

Assume that, for example, to complete the forming on all the memory cells 503 in the memory cell array 502 when they are in the initial state, 10000 units of the electrical stress in normalized cumulative time of application need to be applied to each memory cell 503.

Here, for example, if the application of electrical stress is aborted after application of 150 units of the electrical stress, naturally, not all the memory cells 503 change to the variable state. As a result of the experiment, however, it is found that in this case also, a random number of memory cells 503 can randomly change from the initial state to the variable state in the memory cell array 502.

In other words, the memory cell array 502 can have characteristics in that the memory cells 503 in the initial state are randomly changed to the variable state and randomly kept in the initial state, when the memory cells 503 are applied the forming stress, which is electrical stress for placing the memory cell 503 in the initial state into the variable state.

Taking advantage of this characteristics, data generated owning to the random generation of the memory cells 503 having changed from the initial state to the variable state, may be handled as data which includes (the first-type data) a block-unique key, for example.

Figure 19:
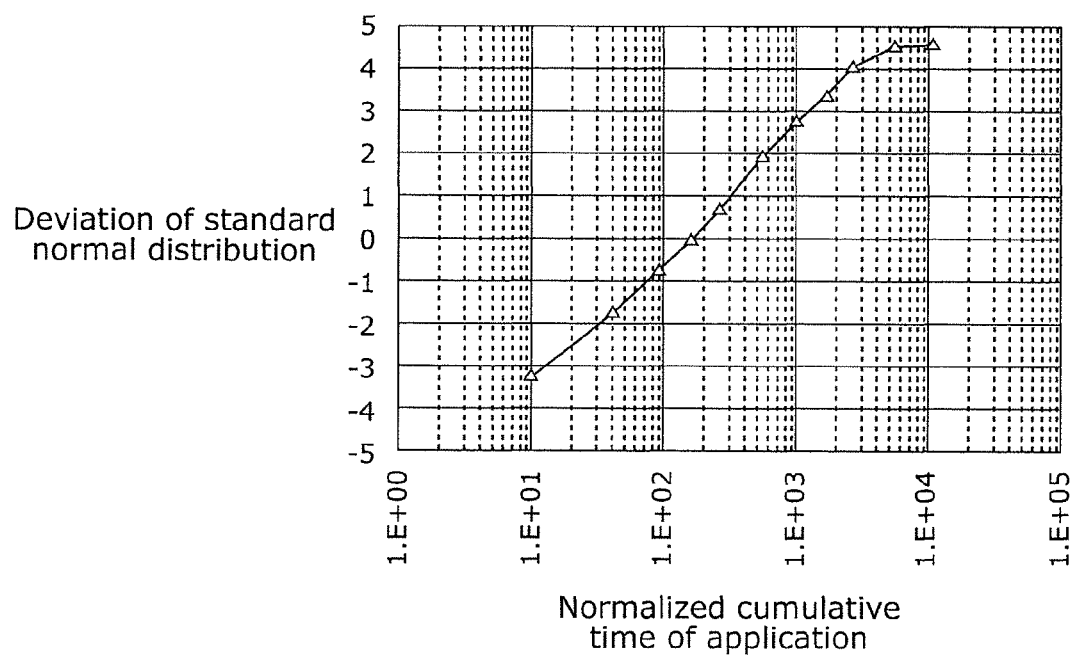
FIG. 19 is a diagram plotting relation of normalized cumulative time of application versus deviation of the standard normal distribution of a memory cell having changed to a variable state.

FIG. 19 is a diagram plotting relation of normalized cumulative time of application versus deviation of the standard normal distribution of a memory cell 503 having changed to the variable state. The element includes the first electrode 513 comprising tantalum nitride (TaN), the second electrode 511 comprising iridium (Ir), the variable resistance layer 512 comprising tantalum oxide having a layered structure, wherein the variable resistance layer 512 has a thickness of 50 nm, the area of the contact surface between the first electrode 513 and the variable resistance layer 512 and the area of the contact surface between the second electrode 511 and the variable resistance layer 512 are each 0.25 μm² or less.

Among the layers constituting the variable resistance layer 512, a layer in contact with the first electrode 513 has low oxygen concentration, having a composition represented by $TaO_x$ where 0<x<2.5. A layer in contact with the second electrode 511, in contrast, has high oxygen concentration, having a composition represented by $TaO_y$ where y≥2.1, and a thickness of about 5.5 nm.

In the forming stress, a voltage is 3.5 V, and a shortest pulse width is 10 μSec. The number of memory cells 503 (the capacity of the memory cell array 502) is 256 kilo bits. It should be noted that the cumulative time of application shown in FIG. 19 is a normalized time which has a predetermined function based on the shortest pulse width.

As shown in the figure, normal distribution of the cumulative number of bits having been through the forming is substantially linear to the cumulative time of application. This suggests that the change from the initial state to the variable state is a phenomenon which occurs in a fairly random manner. Making use of such randomness of change to the variable state allows creation of unique and random block-unique keys for each encryption and recording apparatus 2.

In FIG. 19, as the application of electrical stress (the forming stress) by the forming process is aborted once the normalized cumulative time of application has reached "150," substantially half the memory cells 503 have changed to the variable state whereas substantially another half have not. The memory cells 503 having changed to the variable state are randomly located. In this case, random data is generated by some of the memory cells 503 in the memory cell array 502 being selected randomly, and the random data are recorded into the memory cell array 502. Data (the first-type data) written by aborting the forming process on the memory cell array 502 as such are random and unique for each apparatus.

It is contemplated that, in addition to variations in fabrication process and shape of the variable resistance elements, a reason why the memory cells 503 are randomly and uniquely placed into the variable state and randomly and uniquely kept in the initial state is due to a fact that the memory cells 503 on which the forming has been completed arise randomly, for example.

As described above, locations of vacancy sites in metal oxide are random depending on a memory cell 503, and the forming connects these vacancy sites to form a filament. Thus, it is contemplated that, even if certain electrical stress is applied to the plurality of memory cells 503 in the initial state, the memory cells 503 the forming on which has been completed vary statistically (like the standard normal distribution, for example).

Thus, it is contemplated that even if uniform stress is applied to the plurality of memory cells 503 during the forming process, the electrical stress is adjustable in a manner that, probabilistically, a filament is formed in some elements and not in some elements. It is inferred that the same mechanism explains so long as a material is used in which a filament path is formed by connecting oxygen vacancy sites.

In general, to generate random block-unique keys, random values are used which are generated using a predetermined function in an apparatus. However, if the same function and the same initial value are inputted, this ends up outputting the same value, depending on the number of arithmetic operations. If the function and the initial value are leaked, random values generated in the apparatus are predicted and encryption keys generated from the random values are inferred, for example. This could escalate into a security incident.

Generating a random value, making use of a change from the initial state to the variable state, which is a random phenomenon unique to a variable resistance element, can establish the method for generating a random value in an unpredictable manner. In other words, the randomness is further increased and effective if random data, which is written by aborting the forming process performed on the plurality of memory cells 503 (abort the application of the forming stress before completion of forming on all the plurality of memory cells 503), is used as the initial value of the function for obtaining the above-stated random value.

For example, the process of aborting the forming process as described above is performed on the plurality of memory cells 503 in a predetermined region in the memory cell array 502 of the variable resistance memory 501. This results in random presence of memory cells 503 kept in the initial state and memory cells 503 having changed to the variable state in the predetermined region.

In this case, for example, a plurality of random values (a sequence of bits) are obtained from the predetermined region by reading, via the special read command, the memory cells 503 remained in the initial state as "0," and reading the memory cells 503 having changed to the variable state as "1." These values are used as block-unique keys corresponding to blocks that are included in a normal region, among the blocks included in the memory cell array 502.

Specifically, values which are read from the predetermined region and indicated in a sequence of bits having a predetermined length are registered as a block-unique key into the key management table 241. Alternatively, by registering into the key management table 241 a pointer specifying any one of the addresses in the predetermined region, a value which is read from the address and indicated in a sequence of bits having the predetermined length may be treated as a block-unique key. It should be noted that the pointer may be registered into the key management table 241 prior to generating a plurality of random values by aborting the above forming process.

In such a manner, the variable resistance memory 501 can (i) record data the recording of which is indicated, by applying the forming stress only to selected memory cells 503, and (ii) generate (record) a plurality of data items indicating random values, by aborting the application of the forming stress to the plurality of memory cells 503. In either cases of (i) and (ii), data recorded to the variable resistance memory 501 is data (the first-type data) which is recorded, based on a difference for each memory cell 503 as to whether the memory cell 503 has a resistance value in the initial resistance value range or not.

As described above, the variable resistance memory 501 according to the embodiment 2 has the follows features.
(First Feature)

Controlling the electrical stress (the forming stress) to be applied during the forming achieves the number of memory cells 503 in the initial resistance value range and the number of memory cells 503 in the variable state in suitable proportions. This allows the sizes of regions accessed respectively via the special write command and the special read command to be adjusted so that a plurality of block-unique keys can be generated and stored.
(Second Feature)

Generating a random value, making use of a change from the initial state to the variable state, which is the random phenomenon unique to a variable resistance element, allows a random value to be generated in an unpredictable manner. This achieves generation of a plurality of block-unique keys that have more confidentiality, for example.
(Third Feature)

The special write command causes concealed data, such as a block-unique key, to be written to a variable resistance memory 501, and the special read command is used by the encryption and recording apparatus 2 to read the concealed data. This makes the concealed data readable and writable within the encryption and recording apparatus 2, and unreadable directly from the access apparatus 1.

In other words, owning to the above characteristics, the variable resistance memory 501 can generate block-unique keys which are highly random, and securely conceal the block-unique keys. Thus, the variable resistance memory 501 is a nonvolatile memory suited as the first nonvolatile memory 24.

As the above, the embodiments 1 and 2 have been described by way of example of the technology of the present disclosure. To this extent, the accompanying drawings and detailed description are provided.

Thus, the components set forth in the accompanying drawings and detailed description include not only components essential to solve the problems but also components unnecessary to solve the problems but for illustrating the above technology. Thus, those unnecessary components should not be acknowledged essential due to the mere fact that the unnecessary components are depicted in the accompanying drawings or set forth in the detailed description.

Moreover, while the present invention has been described with reference to the above embodiments 12, it is understood that the present invention is not limited to the above embodiments 1 and 2. Various modifications may be made to the embodiments 1 and 2, without departing from the spirit or scope of the present invention. The numeric values described in the embodiments 1 and 2 are illustration and may be different values. Moreover, the various modifications described with reference to the embodiment 1 may be applied to the embodiment 2.

INDUSTRIAL APPLICABILITY

The present disclosure is applicable to encryption and recording apparatuses, such as memory cards or HDD or SSD, which are connected to access apparatuses such as personal computers (PC), tablets, smartphones, or game consoles.

REFERENCE SIGNS LIST 1 access apparatus
2 encryption and recording apparatus
11, 21 CPU
12, 22 RAM
13, 23 ROM
14 nonvolatile memory
15, 25 interface
24 first nonvolatile memory
26 second nonvolatile memory
131 access control unit
141 password management table 231 encryption and decryption control unit
241 key management table
261 encrypted data
301 file system management information region
302 user data region
303 master boot record partition table
304 partition boot sector
305, 306 FAT
307 root directory entry
308 directory entry
401 address translation table
402 spare block-unique key table
501 variable resistance memory
502 memory cell array
503 memory cells
504 write circuit
505 read circuit
510 variable resistance element
511 second electrode
512 variable resistance layer
513 first electrode
514 underlying layer

The invention claimed is:

1. An encryption and recording apparatus storing data, the encryption and recording apparatus comprising:
a first nonvolatile memory;
a second nonvolatile memory; and
an encryption and decryption controller configured to encrypt and write the data to the second nonvolatile memory, and read the encrypted data from the second nonvolatile memory and decrypt the encrypted data, wherein
the encryption and decryption controller is configured to:
manage an area included in the second nonvolatile memory on a per-block basis, and manage an association between a block and a block-unique key using key management information stored in the first nonvolatile memory;
when receiving a write indication for writing the data from an access apparatus external to the encryption and recording apparatus, receive the data and corresponding information associated with the data, encrypt the data using a plurality of block-unique keys associated with a plurality of blocks included in the second nonvolatile memory, and write the data to the plurality of blocks; and
store the corresponding information in the key management information such that the corresponding information is associated with the plurality of block-unique keys,
the first nonvolatile memory includes a memory cell array in which memory cells are arranged in an array, the memory cells including:
a memory cell in a variable state, which has a resistance value which reversibly transitions among a plurality of variable resistance value ranges in response to application of different electrical signals; and
a memory cell in an initial state, which remains in the initial state unless a forming stress is applied, and has a resistance value in an initial resistance value range overlapping with none of the plurality of variable resistance value ranges, the forming stress being electrical stress for placing the memory cell in the initial state into the variable state,
the memory cell array can record first-type data and second-type data,
the first-type data is recorded, based on a difference for each of the memory cells as to whether the memory cell has a resistance value in the initial resistance value range or not,
the second-type data is recorded, based on a difference for each of the memory cells as to whether the memory cell has a resistance value in at least one of the plurality of variable resistance value ranges or not, rather than based on the difference as to whether the memory cell has a resistance value in the initial resistance value range or not,
the first-type data includes the plurality of block-unique keys, and
the data is encrypted using a password which is the corresponding information, prior to being transmitted together with the write indication from the access apparatus.

2. The encryption and recording apparatus according to claim 1, wherein
the memory cell array has a characteristic in that the memory cells in the initial state are randomly placed into the variable state and randomly kept in the initial state when the electrical stress for placing the memory cells into the initial state is applied to the memory cells, and
the plurality of block-unique keys are generated, based on the characteristic.

3. The encryption and recording apparatus according to claim 1, wherein
a lower limit of the initial resistance value range is greater than or equal to upper limits of all the plurality of variable resistance value ranges.

4. The encryption and recording apparatus according to claim 1, wherein
an upper limit of the initial resistance value range is less than or equal to lower limits of all the plurality of variable resistance value ranges.

5. The encryption and recording apparatus according to claim 1, wherein
where N is an integer greater than or equal to 3,
the memory cells in the variable state each reversibly transition between N−1 variable resistance value ranges among the plurality of variable resistance value ranges, in response to application of different electrical signals, and
multi-level data is recorded, based on a difference for each of the memory cells in the memory cell array as to whether the memory cell has a resistance value included in any one of N resistance value ranges including the initial resistance value range and the N−1 variable resistance value ranges.

6. An encryption and recording method for encrypting and recording data in an encryption and recording apparatus, the encryption and recording method comprising:
receiving, by an encryption and decryption controller included in the encryption and recording apparatus, from an access apparatus external to the encryption and recording apparatus, (i) a write indication for writing the data, (ii) the data, and (iii) corresponding information associated with the data, wherein the encryption and recording apparatus further includes a first nonvolatile memory and a second nonvolatile memory;
encrypting and writing the data, by the encryption and decryption controller, to the second nonvolatile memory; reading the encrypted data, by the encryption and decryption controller, from the second nonvolatile memory and decrypting the encrypted data, wherein an area included in the second nonvolatile memory is managed on a per-block basis, and wherein an association between a block and a block-unique key is managed using key management information stored in the first nonvolatile memory;

encrypting, by the encryption and decryption controller, the data using a plurality of block-unique keys associated with a plurality of blocks included in the second nonvolatile memory, and writing, by the encryption and decryption controller, the data to the plurality of blocks; and storing, by the encryption and decryption controller, the corresponding information in the key management information such that the corresponding information is associated with the plurality of block-unique keys, wherein the encryption and recording apparatus causes the following steps to be performed in a memory cell array of the first nonvolatile memory in which memory cells are arranged in an array:

reversibly transitioning a memory cell from the memory cells of the memory array such that each memory cell has a resistance value from a plurality of variable resistance value ranges which transitions in response to application of different electrical signals;

applying forming stress as electrical stress to place a memory cell in an initial state into a variable state, wherein the memory cell remains in the initial state unless the forming stress is applied and has a resistance value in an initial resistance value range overlapping with none of the plurality of variable resistance value ranges;

recording first-type data and second-type data in the memory cell array;

recording the first-type data based on a difference for each of the memory cells as to whether the memory cell has a resistance value in the initial resistance value range or not;

recording the second-type data based on a difference for each of the memory cells as to whether the memory cell has a resistance value in at least one of the plurality of variable resistance value ranges or not, rather than based on the difference as to whether the memory cell has a resistance value in the initial resistance value range or not; and encrypting the data using (i) the plurality of block-unique keys which are included in the first-type data and (ii) a password which is the corresponding information, prior to being transmitted together with the write indication from the access apparatus.

* * * * *